US008995542B2

(12) United States Patent
Kumar

(10) Patent No.: US 8,995,542 B2
(45) Date of Patent: Mar. 31, 2015

(54) MULTI TRANSFORM OFDM SYSTEMS AND METHODS WITH LOW PEAK TO AVERAGE POWER RATIO SIGNALS

(71) Applicant: Rajendra Kumar, Cerritos, CA (US)

(72) Inventor: Rajendra Kumar, Cerritos, CA (US)

(*) Notice: Subject to any disclaimer, the term of this patent is extended or adjusted under 35 U.S.C. 154(b) by 0 days.

(21) Appl. No.: 13/913,761

(22) Filed: Jun. 10, 2013

(65) Prior Publication Data

US 2014/0362934 A1 Dec. 11, 2014

(51) Int. Cl.
*H04K 1/10* (2006.01)
*H04L 27/28* (2006.01)
*H04L 27/26* (2006.01)

(52) U.S. Cl.
CPC ........ *H04L 27/2602* (2013.01); *H04L 27/2614* (2013.01)
USPC ............................ 375/260; 375/259; 375/267

(58) Field of Classification Search
CPC .................................. H04B 3/32; H04L 5/26
USPC ........................................................ 375/260
See application file for complete search history.

(56) References Cited

U.S. PATENT DOCUMENTS

| 4,843,584 | A  | * | 6/1989 | Sundaramurthy | ............ 708/446 |
| 6,178,158 | B1 | * | 1/2001 | Suzuki et al. | ................. 370/203 |
| 6,987,959 | B1 | * | 1/2006 | Correia et al. | ............. 455/277.1 |
| 8,705,641 | B2 | * | 4/2014 | Tsai et al. | ...................... 375/260 |
| 2006/0078040 | A1 | * | 4/2006 | Sung et al. | ..................... 375/140 |
| 2011/0234314 | A1 |   | 9/2011 | Kumar | |
| 2012/0280749 | A1 |   | 11/2012 | Kumar | |

OTHER PUBLICATIONS

P. Van Eetvelt, G. Wade and M. Tomlinson, Peak to Average Power Reduction for OFDM Schemes by Selective Scrambling, Electronics Letters, Oct. 10, 1996, pp. 1963-1964; vol. 32.
Richard Van Nee and Arnout De Wild, Reducing the Peak-to-Average Power Ratio of OFDM, IEEE, 1998, pp. 2072-2076, The Netherlands.
Luqing Wang and Chintha Tellambura, A Simplified Clipping and Filtering Technique for PAR Reduction in OFDM Systems, IEEE Signal Processing Letters, Jun. 2005, pp. 453-456, vol. 12.
T.A. Wilkinson and A.E. Jones, Minimisation of the Peak to Mean Envelope Power Ratio of Multicarrier Transmission Schemes by Block Coding, IEEE, 1995, pp. 825-829.
Jia-Chyi Wu, Chi-Min Li and Chao-Chin Tseng, A PDSI with STBC Scheme for PAPR Reduction in OFDM System, IEEE, 2011, pp. 3851-3854, National Taiwan Ocean University, Taiwan.

(Continued)

*Primary Examiner* — Qutbuddin Ghulamali
(74) *Attorney, Agent, or Firm* — Fulwider Patton LLP

(57) ABSTRACT

Various embodiments of the invention are directed to methods and systems for multi transform OFDM transmitter and receivers with low peak to average power ratio (PAPR) signals, that have high bandwidth efficiency and are computational efficient. For example, various embodiments of the transmitter may utilize an architecture comprised of a baseband modulator, a serial to parallel converter, a bank of multiplicity $N_T$ orthonormal transforms unit, a bank of multiplicity $N_T$ inverse Fourier transforms unit, a dummy symbols generator, and a minimum PAPR evaluation unit for finding the optimum transform index $n_0$. Various embodiments of the receiver may comprise of a transform index detection unit for the detection of the transform index imbedded in the OFDM signal.

21 Claims, 13 Drawing Sheets

(56) References Cited

OTHER PUBLICATIONS

A.E. Jones, T.A. Wilkinson and S.K. Barton, Block Coding Scheme for Reduction of Peak to Mean Envelope Power Ratio of Multicarrier Transmission Schemes, Electronics Letters, Dec. 8, 1994, pp. 2098-2099, vol. 30, No. 25.

R.W. Bauml, R.F.T. Fischer and J.B. Huber, Reducing the Peak-to-Average Power Ratio of Multicarrier Modulation by Selected Mapping, Electronics Letters, Oct. 24, 1996, pp. 2056-2057, vol. 32, No. 22.

Heung-Gyoon Ryu, Jae-Eun Lee and Jin-Soo Park, Dummy Sequence Insertion (DSI) for PAPR Reduction in the OFDM Communication System, IEEE, 2004, pp. 89-94.

Imran Baig and Varun Jeoti, DCT Precoded SLM Technique for PAPR Reduction in OFDM Systems, Electrical & Electronic Engineering Department, Universiti Teknologi PETRONAS, Malaysia, pp. 3, Yr-2010.

Sang-Woo Kim, Jin-Kook Chung and Heung-Gyoon Ryu, PAPR Reduction of the OFDM Signal by the SLM-based WHT and DSI Method, IEEE, 2006, Department of Electronic Engineering, Chungbuk National University, Korea.

Dr. Rajendra Kumar and Mr. Mubeen Khan, Mitigation of Multipath Effects in Broadband Wireless Systems Using Quantized State Adaptive Equalization Methods, IEEE, 2006, pp. 1-9, California State University, Long Beach, California.

S.H. Muller and J.B. Huber, OFDM With Reduced Peak-to-Average Power Ratio by Optimum Combination of Partial Transmit Sequences, Electronics Letters, Feb. 27, 1997, pp. 368-369, vol. 33, No. 5.

Stefan H. Muller and Johannes B. Huber, A Comparison of Peak Power Reduction Schemes for OFDM, IEEE, 1997, pp. 1-5, Germany.

Hideki Ochiai and Hideki Imai, MDPSK-OFDM With Highly Power-Efficient Block Codes for Frequency-Selective Fading Channels, IEEE Transactions on Vehicular Technology, Jan. 2000, pp. 74-82, vol. 49, No. 1.

Imran Baig and Varun Jeoti, PAPR Analysis of DHT-Precoded OFDM System for M-QAM, Electrical & Electronic Engineering Department, Universiti Teknologi PETRONAS, Malaysia, pp. 1-4, 2010.

Yoshiaki Tadokoro and Tatsuo Higuchi, Discrete Fourier Transform Computation via the Walsh Transform, IEEE Transactions on Acoustics, Speech, and Signal Processing, Jun. 1978, pp. 236-240, vol. ASSP-26, No. 3.

* cited by examiner

Points of the signal diagram with indices 1, 3, 5, 7, 17, 19, 21, 23, 33, 35, 37, 39, 49, 51, 53 and 55 selected for transform indices

MULTI TRANSFORM OFDM SYSTEMS AND METHODS WITH LOW PEAK TO AVERAGE POWER RATIO SIGNALS

BACKGROUND

Broadband wireless systems are in a rapidly evolutionary phase in terms of the development of various technologies, development of various applications, deployment of various services and generation of many important standards in the field. Although there are many factors to be considered in the design of these systems, the key factors have been the bandwidth utilization efficiency due to the limited bandwidth allocation, flexibility in operation and robustness of the communication link in the presence of various disturbances while achieving the specified performance. Orthogonal Frequency Division Multiple Accessing (OFDM) techniques offer efficient bandwidth utilization and provide some immunity against one of the most common type of distortion, viz., the distortion due to the multipath propagation environment. Therefore, the OFDM techniques have been adapted in many wireless communication standards, such as the World-wide Interoperability for Microwave ACCESS (Wimax), digital audio broadcasting (DAB), digital video broadcasting-terrestrial (DVB-T), Long Term Evolution (LTE), etc.

One of the advantages of the OFDM system is the mitigation of a major source of distortion present in high data rate wireless communication links, namely the inter symbol interference (ISI) achieved by reducing the symbol period by the use of multiple carrier transmission. However, the use of a large number of carriers based on the orthogonality property in the OFDM system makes the performance of the system very sensitive to any carrier frequency offsets introduced, for example, by the Doppler shifts encountered in the wireless channels. The proper operation of the OFDM system requires means for precise estimate of the Doppler that may be different for different carriers in the frequency selective fading channel, and means to mitigate such a Doppler effect from the received OFDM signal. Various methods exist in the prior art to solve this problem.

An outstanding problem arising with the use of a relatively large number N of carriers used in the OFDM signal is a relatively high peak to average power ratio resulting in a much reduced radio frequency (RF) power amplifier efficiency. Due to the inherent saturation in the RF power amplifier, the signal with amplitude exceeding the input linear range of the amplifier is clipped or distorted. In order to keep the distortion to some specified limit arrived at by the signal to distortion plus noise power ratio considerations, the output RF power is backed off from the maximum available power at the amplifier output and higher is the peak to average power ratio of the signal at the amplifier input, larger is the required back off in the output power. The output back off concurrently also results in the reduction of the DC to RF power conversion efficiency of the RF power amplifier thus increasing the drain on the battery or any other power supply source in the mobile devices. Another problem arising due to distortion caused by the amplifier is the spreading of the spectrum of the OFDM signal outside the allocated band. Thus there has been strong motivation to come up with methods to reduce the peak to average power ratio of the OFDM signal without causing any distortion in the process of transformation, or losing in terms of bandwidth or other important efficiency measures.

Among the various methods to reduce the peak to average power ratio of the OFDM signal is the clipping method wherein the signal above a certain specified value is clipped. This is similar to the clipping by the amplifier and thus introduces distortion, however, clipping and filtering the signal before inputting to the RF amplifier may mitigate the problem of spectrum spreading that is encountered by the clipping caused by the amplifier. Moreover, by using adaptive threshold in clipping some possible reduction in distortion may be achieved.

The selective mapping (SLM) method of PAPR reduction consists of forming K vectors $P^q$, $q=1, 2, \ldots, Q$, for some integer Q, with the $i^{th}$ element of the vector $P^q$ selected equal to $P_i^q = \exp[j\phi_i^q]$; $j=\sqrt{-1}$, $i=0, 1, \ldots, N-1$ with the dimension of the modulation symbol vector X(k) equal to N. The phase $\phi_i^q$ is selected in a random manner with a uniform probability density function over the interval $[0, 2\pi]$. The set of vectors thus formed is made known to the receiver in advance. For any time k, the modulation symbol vector X(k) is component wise multiplied by each of the Q vectors $P^q$ resulting in the modified vector $X^q(k)$, $q=1, 2, \ldots, Q$. This follows evaluation the inverse fast Fourier transform (IFFT) $x^q(k)$ of $X^q(k)$ and computing the peak to average power ratio of the OFDM modulation signal vector $x^q(k)$ for $q=1, 2, \ldots, Q$. The vector $x^q(k)$ with the minimum PAPR is selected for transmission with the corresponding index $q_0$ made available to the receiver as a side information.

In the partial transmit sequence (PTS) method, the set of indices 0 through N−1 is partitioned into V disjoint subsets $S_v$, $v=1, 2, \ldots, V$ wherein each of the V subsets has (N/V) indices. For v equal to 1 through V, a vector $X^v(k)$ of length N is obtained with all its elements equal to 0 except the ones with indices in the subset $S_v$ that are selected to be equal to the corresponding elements of the vector X(k) resulting in $$X(k) = \sum_{v=1}^{V} X^v(k).$$

Each of the V vectors is inverse Fourier transformed using the IFFT providing the V signal vectors $x^v(k) = F^{-1}\{X^v(K)\}$ wherein $F^{-1}$ denotes the inverse Fourier transform. The signal vectors are multiplied by the complex scalars $\exp[j\phi^v(k)]$ with $\phi^v$ selected randomly and is uniformly distributed over the interval $(0, 2\pi)$. The weighted signal vectors are summed and the PAPR of the resulting sum is computed. The PAPR is minimized over the selection of the scalars $\exp[j\phi^v(k)]$ and the result of such a minimization is selected for transmission. The selected coefficients are provided to the receiver as a side information.

In the dummy sequence insertion (DSI) method of the PAPR reduction, the vector X(k) is comprised of $N_I$ modulation symbols and $N_D = (N − N_I)$ dummy symbols resulting in $X(k) = [X^{IT}(k) \ X^{IT}(k)]^T$ wherein T denotes the matrix transpose, and $X^I(k)$ and $X^D(k)$ are the vectors of length $N_I$ and $N_D$ and comprised of the modulation symbols and dummy symbols respectively. The DSI method results in a reduction of the bandwidth efficiency by a factor of $(N_I/N)$, however, it does not require any side information. The selection of the dummy sequence is comprised of an initial step and a recursive step that modifies the dummy sequence until the PAPR of $x(k) = F^{-1}\{X(K)\}$ is below a threshold or the number of recursions exceeds some maximum permissible number of recursions. Four different methods for the selection of the dummy sequence have been suggested in. In the first method, the dummy sequence is comprised of a complementary sequence with different complementary sequences selected in the recursive step. In another method, the initial dummy sequence is selected to be an all 0 or an all 1 sequence, with the recursion step comprised of sequentially flipping the dummy sequence bits until the PAPR below the threshold value is achieved or the number of recursions exceed a specified limit.

In the method of selective scrambling, the message bit sequence is scrambled by each of the four m-sequences that are not cyclically shifted versions of each other, with the two bits representing the index q of the m-sequence appended to the scrambled sequence. The scrambled sequences are modulated into QPSK symbols resulting in the OFDM modulation symbol vectors $X^q(k)$ which are inverse Fourier transformed resulting in the OFDM modulated signal vectors $x^q(k)$ for q=1, 2, 3 and 3. The vector among the 4 vectors $x^q(k)$ with a minimum PAPR is selected for transmission. This method is very similar to the SMI method with the difference that it is the bit sequence that is scrambled instead of the QPSK modulation symbol sequence in the SMI method.

In the block coding schemes for the PAPR reduction, the OFDM modulation symbol vector X(k) is transformed using one of the block error correction codes. For example, the use of complementary sequence codes is taught by H. Ochiai and H. Imai, in "MDPSK-OFDM with Highly Power Efficient Block Codes for Frequency-Selective Fading Channels," IEEE Transactions on Vehicular Technology, Vol. 49, No. 1, January 2000, pp. 74-82. While the use of the block error correction codes to reduce the PAPR while simultaneously achieving the error correction capability of the code is of interest, however, the presently studied schemes based on block error correction codes may require relatively very low code rate codes resulting in relatively very poor bandwidth efficiency at relatively high number of carriers as concluded by H. Ochiai and H. Imai in their teachings. In the precoding techniques proposed earlier the OFDM modulation symbol vector X(k) is pre multiplied by a fixed orthogonal matrix P resulting in the transformed symbol vector $X^P(k)=PX(k)$. The inverse Fourier transform of the transformed symbol vector provides the OFDM signal vector x(k) for the transmission. The precoding matrix P is signal independent and is known to the receiver. The orthogonal transforms that have been used in the prior art are the discrete Hartley transform (DHT), discrete cosine transform, and the Walsh Hadamard transform (WHT).

The prior methods of the PAPR reduction provide some improvement in the PAPR especially for low order modulation schemes such as the QPSK modulation. However, for high order modulation such as 64 QAM or 256 QAM and for relatively large number of subcarriers N, most of the prior methods provide only a limited reduction in the PAPR with the resulting PAPR significantly higher compared to that for the case of single carrier modulation. Some of the prior schemes have poor bandwidth efficiency, while others require extensive computational effort. It is desirable to have PAPR reduction systems and methods that achieve a PAPR that is comparable to that for the case of single carrier modulation thus almost completely eliminating the PAPR penalty arising from the use of multi carrier modulations methods such as the OFDM system, have high bandwidth efficiency, are computationally efficient and provide for a tradeoff between the PAPR performance and the computational requirements. The systems and methods of this invention possess these and various other benefits.

SUMMARY OF THE INVENTION

Various embodiments of the invention are directed to methods and systems for multi transform OFDM transmitters and receivers with low peak to average power ratio signals that have high bandwidth efficiency and are computational efficient. For example, various embodiments of the transmitter may utilize an architecture comprised of a baseband modulator for receiving and modulating the user input data providing the, in general complex valued, information baseband symbols, a serial to parallel converter for providing the modulation symbol vector of dimension N with $N_I \leq N$ baseband symbols, a bank of multiplicity $N_T$ orthonormal transforms unit operating on the modulation symbol vector providing the multiplicity $N_T$ transformed symbol vectors, a bank of multiplicity $N_T$ inverse Fourier transforms unit for providing the multiplicity $N_T$ transformed OFDM signal vectors, a minimum PAPR (peak to average power ratio) evaluation unit for finding the optimum transform index $n_0$ from the multiplicity $N_T$ transformed OFDM signal vectors, and a means of transmitting the transform index. In various embodiments of the invention the baseband modulator may be one out of the group comprised of the MQAM modulator and the MPSK modulator.

Various embodiments of the multi transform OFDM transmitter of the invention may further comprise a cascade of a parallel to serial converter, a guard interval insertion unit, a band limiting filter for spectral shaping, and carrier modulation unit for bandpass modulation, for providing the band pass OFDM signal when inputted with the transformed OFDM signal vector.

Various embodiments of multi transform-DSI OFDM transmitter may comprise of a dummy symbol generator for providing $N_D \leq N-N_I$ number of dummy symbols selected from a subset of $N_W$ symbols of the signal constellation of the baseband modulator that are imbedded into the modulation symbol vector. In various embodiments of the invention with MQAM baseband modulator the $N_W$ symbols of the signal constellation may correspond to the 4 corner signal points of the signal constellation diagram. In various other embodiments of the invention with MPSK baseband modulator the $N_W$ symbols of the signal constellation may have their respective phase equal to 0, $\pi/2$, $\pi$, and $3\pi/2$.

In various embodiments of the invention, the bank of multiplicity $N_T$ orthonormal transforms unit are comprised of the cascades of the orthonormal transforms selected from a group of basic transforms comprised of the Walsh Hadamard transform (WHT), discrete cosine transform (DCT), and the discrete Hartley transform (DHT). In the evaluation of the $N_T$ orthonormal transforms, fast transform implementation requiring order $N \log_2(N)$ computations may be used resulting in $N_T N \log_2(N)$ computations in the valuation of the $N_T$ orthonormal transforms. In various embodiments of the invention, the number $N_T$ of orthonormal transforms may be selected, for example, in the range of 4 and 16.

In various embodiments of the multi transform OFDM transmitter, the transform index n of each of the orthonormal transform is encoded into a number $N_i$ of indexing symbols $s_i^n$ selected from signal constellation of the baseband modulator, and the indexing symbols are imbedded as $N_i$ selected elements of the modulation symbol vector that is transformed by the orthonormal transform with index n. In some alternative embodiments of the multi transform OFDM transmitter, the optimum transform index $n_0$ may be transmitted on a side information channel.

In various embodiments of the multi transform OFDM transmitter, the transform index n is encoded into a number $N_i$ of indexing symbols, a first vector is derived from the number $N_i$ of indexing symbols, and added to the transformed OFDM signal vector. In various embodiments, the orthonormal transform matrix is in the partitioned form such that the indexing symbols are not modified by the orthonormal transform resulting in the imbedding of the indexing symbols into the transformed symbol vector.

In various embodiments of the multi transform-DSI OFDM transmitter, a number $N_D \leq N-N_I$ of dummy symbols are provided by the dummy symbol generator, a second vector is derived from the $N_D$ dummy symbols, and is added to the transformed OFDM signal vector, wherein the computation of the orthonormal and IFFT transforms is not repeated with each trial of the dummy symbols resulting in computationally efficient architectures.

Various embodiments of the multi transform OFDM receiver may utilize an architecture comprised of a receive antenna for receiving the bandpass OFDM signal, an RF bandpass filter/amplifier for filtering and amplifying the bandpass OFDM signal, an RF to baseband conversion unit for providing the baseband OFDM signal, a cascade of a band limiting filter, a guard interval deletion unit, and a serial to parallel converter for providing the transformed OFDM signal vector from the baseband OFDM signal, an FFT unit for providing the transformed symbol vector, a transform index detection unit for detecting the transform index $n_0$ from the transformed symbol vector; a bank of multiplicity $N_T$ inverse orthonormal transforms for providing the OFDM symbol vector, a parallel to serial converter for providing the baseband information symbols from the OFDM symbol vector, and a baseband demodulation unit for providing the estimate of the user input data.

In various embodiments, the transform index detection unit is comprised of a bank of $N_T$ units of metric computations with the unit n, for n=1 through $N_T$, comprised of a multiplier for multiplying the transformed symbol vector by a sub matrix comprised of $N_i$ rows of the orthonormal transform matrix with index n, an adder for subtracting the vector of I\T; indexing symbols form the resulting product; and a mod square block for generating the $n^{th}$ metric, and a minimum function unit for providing the index $n_0$ corresponding to the minimum of the $N_T$ metrics.

In various alternative embodiments of the invention wherein the orthonormal transform matrices are in the partitioned form, the transform index detection unit may be comprised of a bank of $N_T$ units of metric computations with the unit n, for n=1 through $N_T$, comprised of an adder for subtracting the vector of $N_i$ indexing symbols form a sub vector of the transformed symbol vector; and a mod square block for generating the $n^{th}$ metric; and a minimum function unit for providing the index $n_0$ corresponding to the minimum of the $N_T$ metrics.

BRIEF DESCRIPTION OF THE DRAWINGS

Various embodiments of the present invention are described here by way of example in conjunction with the following figures, wherein.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide systems and methods for multi transform OFDM systems with reduced peak to average power ratio signals.

Figure 1:
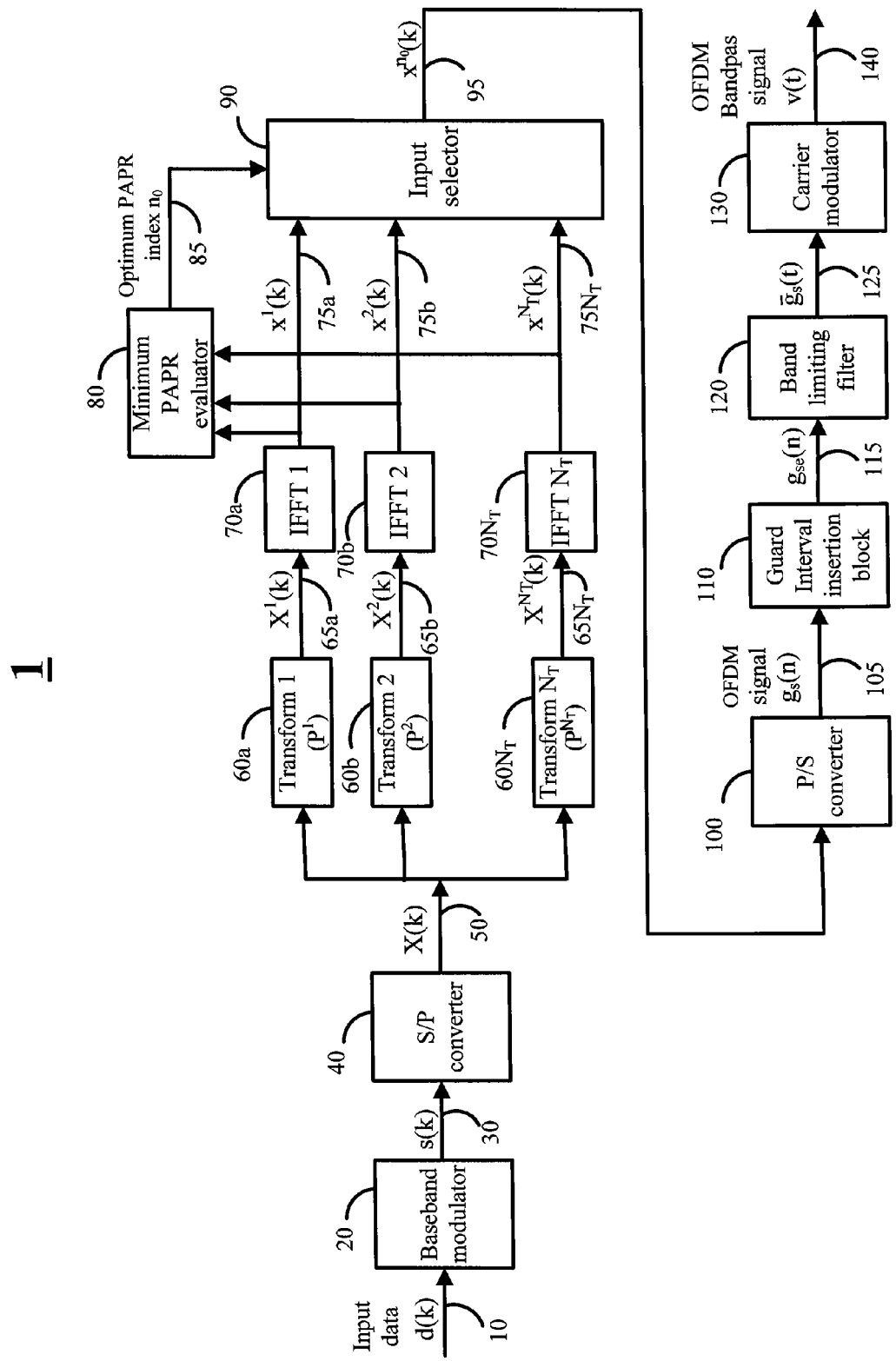
FIG. 1 shows a block diagram of one embodiment of multi transform OFDM transmitter system.

FIG. 1 shows the block diagram of one of the various embodiments of the invention. Referring to the OFDM transmitter 1 block diagram in FIG. 1, the user input data 10 d(k) that may be binary valued taking possible values 0 and 1, wherein k denotes the discrete time, is inputted to the baseband modulator 20. The baseband modulator segments the input data into groups of m binary valued data bits and maps each of the groups of the m binary data bits into one of the $M=2^m$, in general complex valued, information baseband symbols 30 s(k) with m selected equal to an integer greater than or equal to 1. The one to one mapping of the groups of m binary valued data bits into the corresponding baseband symbol may be based on any of the baseband modulation techniques, selected, for example, from the set of the MQAM (M'ary Quadrature Amplitude Modulation), the MPSK (M'ary Phase Shift Keying), and the MASK (M'ary Amplitude Shift Keying) modulation techniques.

Referring to FIG. 1, the information baseband symbols 30 s(k) are inputted to the serial to parallel converter 40. The serial to parallel converter 40 splits the, in general complex valued, information baseband symbol sequence {s(k)} is split into N subsequences {$s_m(k)$} with $s_m(k)$=s(n), n=kN+m−1, m=1, 2, ..., N−1; k=0, 1, 2 ..., and N is any positive integer possibly equal to some integer power of 2.

Referring to FIG. 1, the serial to parallel converter 40 provides the modulation symbol vector 50 X(k)=[$s_1(k)$ $s_2(k)$ ... $s_N(k)$]$^T$, with T denting the transpose operation, to the $N_T$ transform blocks 60 a, b, ..., $N_T$ wherein the number of transform blocks may be selected to be an integer between 4 and 16. Throughout the description of this invention, the notations a, b, ..., N and 1, 2, ..., N for any integer N are equivalent and both refer to the enumeration between 1 and N. The $N_T$ transform blocks transform the modulation symbol vector X(k) by $N_T$ different transforms providing the $N_T$ transformed symbol vectors $X^1(k), X^2(k), ..., X^{N_T}(k)$ at the outputs, wherein $$X^n(k) = P^n X(k); n=1,2,\ldots,N_T; k=0,1,2,\ldots \quad (1)$$

In (1) $P^n$ for n=1, 2, ..., $N_T$ are some appropriately selected N×N nonsingular matrices. In various embodiments of the invention, the matrices $P^n$, n=1, 2, ..., $N_T$, may be selected to be some orthonormal matrices. For example, with $N_T$=4, the 4 selected matrices may the identity matrix $I_N$ corresponding to no transform, the Walsh-Hadamard transform (WHT) matrix $P^W$, the discrete cosine transform (DCT) matrix $P^C$, and the discrete Hartley transform (DHT) matrix $P^H$.

The three transform matrices are given in terms of their $(m,n)^{th}$ element; m, n=1, 2, ..., N by $$P^H_{m,n} = \frac{1}{\sqrt{N}} \{\cos[2\pi(m-1)(n-1)/N] + \sin[2\pi(m-1)(n-1)/N]\} \quad (2)$$

$$P^C_{m,n} = \sqrt{\frac{2}{N}} \cos[\pi(m-0.5)(n-0.5)/N] \quad (3)$$

with the Walsh-Hadamard transform matrix $P^W$ with its elements equal to +1 or −1 defined recursively in terms of the matrices $W_n$, n=$2^m$, m=2, 3, ... by $$W_{2^m} = \begin{bmatrix} W_{2^{m-1}} & W_{2^{m-1}} \\ W_{2^{m-1}} & -W_{2^{m-1}} \end{bmatrix}; W_2 = \begin{bmatrix} 1 & 1 \\ 1 & -1 \end{bmatrix}; m=2, 3, ... \quad (4)$$

$$P^W = \frac{1}{\sqrt{N}} W_{2^{m_0}}; N = 2^{m_0} \quad (5)$$

The use of scalar $1/\sqrt{N}$ in (2)-(5) makes these matrices orthonormal with $PP^H=I_N$ or $P^{-1}=P^H$ for any of the transform matrices $P^n$ in (2)-(5) with H denoting the matrix conjugate transpose and $I_N$ denoting the N×N identity matrix. Due to symmetry the matrices PH, PW, and PC are also unitary with $P^{-1}=P$. In some embodiments of the invention, the normalizing scalar that is a multiple of $1/\sqrt{N}$ may be dropped in (2)-(5) leaving the transform matrices to be orthogonal but not orthonormal.

The use of the orthogonal or orthonormal matrices permits the use of Fast transform techniques permitting the matrix vector multiplication in order N $\log_2(N)$ operation instead of requiring order $N^2$ operations for obtaining the transformed symbol vector $X^n(k)$. The number of operations can be further reduced by exploiting the known relationships between various transforms. In particular the various transforms may be related to the Fourier transform or the inverse Fourier transform. For example, for a real valued sequence $X^R(k)$ its DHT transform may be obtained in terms of the inverse Fourier transform as $$DHT\{X^R(k)\}=Re\{(1-j)F[^{-1}[X^R(k)]\}; j=\sqrt{-1} \quad (6)$$

In (5) $\Phi^{-1}$ denotes the inverse Fourier transform (IFFT), and Re(z) for any complex quantity denotes the real part of z. With $X(k)=X^R(k)+j X^I(k)$; its DHT transform may be evaluated as $$DHT\{X(k)\}=Re\{(1-j)F[^{-1}[X^R(k)]\}+jRe\{(1-j)F[^{-1}[X^I(k)]\} \quad (7)$$

Thus computing the IFFT of $X^R(k)$ and $X^i(k)$ separately permits a direct computation of the DHT form (11) requiring only order N operations. The required IFFT of X(k) may be evaluated from (8).

$$F^{-1}\{X(k)\}=F[^{-1}[X^R(k)]+jF[^{-1}[X^I(k)] \quad (8)$$

Figure 1A:
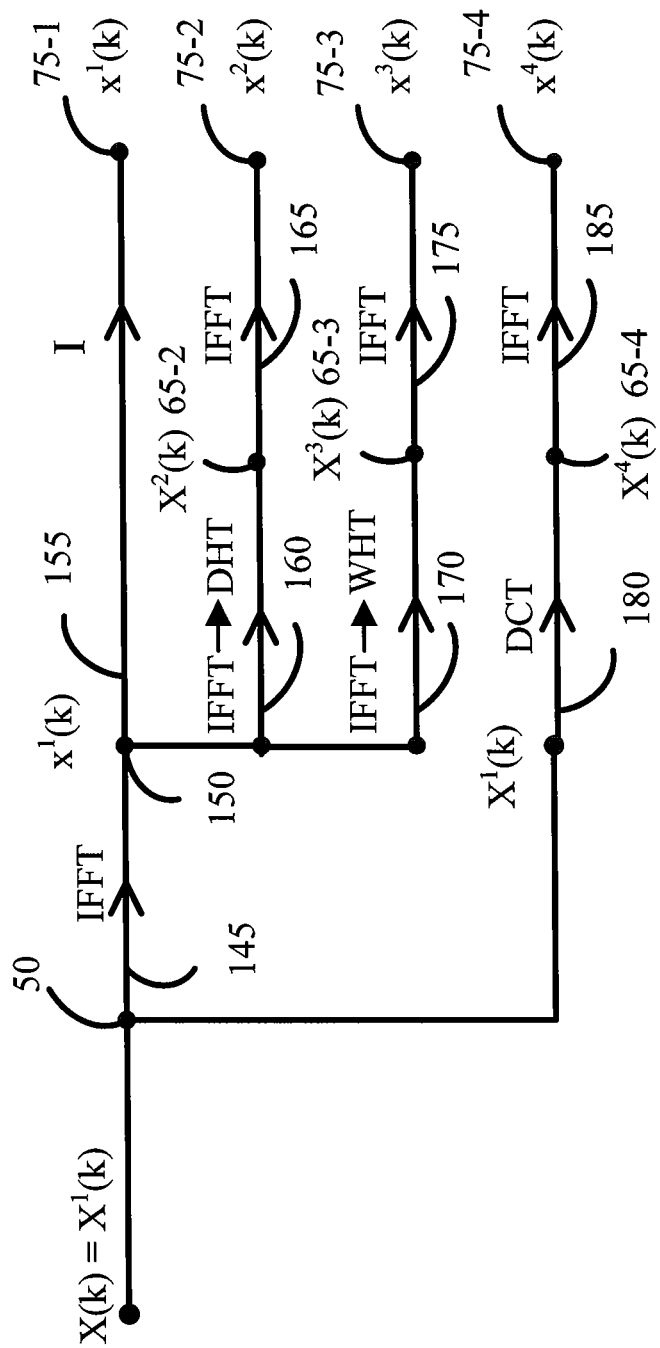
FIG. 1A shows a flow diagram for the computation of transformed OFDM signal vectors for reduced computational requirements.

The computations of IFFT of X(k) from (8) does not require any more computations compared to directly computing the IFFT of X(k). In the same manner the WHT of $X^R(k)$ may be computed in terms of the FFT or IFFT of $X^R(k)$. For example, Y. Tadokoro and T. Higuchi in "Discrete Fourier Transform Computation via the Walsh Transform," IEEE Transactions on ASSP, Vol. ASSP-26, No. 3, June 1978, pp. 236-240, included by reference with this application, teach a method of computing the Fourier transform of a real sequence in terms of its Walsh Hadamard transform. The relationship given in the teachings of Y. Tadokoro and T. Higuchi, may also be used for the computation of WHT in terms of the IFFT. For example, the equation (6) of Tadokoro relates the WHT to the FFT for the case of N=8 requiring only 10 real multiplications equivalent to less than 3 complex multiplications. For the case of $N_T$=4, the order of transforms and IFFT may be performed as shown in FIG. 1A so as to minimize the total number of the required computations.

Referring to FIG. 1, the transformed symbol vector 65n $X^n(k)$ is inputted to the respective IFFT block 70n providing the transformed OFDM signal vector 75n $x^n(k)$ at the output for n=1, 2, ..., $N_T$. The IFFT block 70n evaluates the N point inverse Fourier transform of the input 65n with the output 75n $x^n(k)$ related to $X^n(k)$ by $$x^n(k)=P^F X^n(k); n=1,2, ..., N_T; k=0,1,2, ... \quad (9)$$

with the $(m,n)^{th}$ element of the matrix $P^F$ given by $$P^F_{m,n} = \frac{1}{\sqrt{N}} \exp[2\pi j(m-1)(n-1)/N]; j=\sqrt{-1} \quad (10)$$

The matrix $P^F$ in (9) is an orthonormal matrix and $x^n(k)$ may be evaluated by the inverse fast Fourier transform algorithm similar to the computation of the other transforms such as the DHT etc.

The total computational requirements for the evaluation of the $N_T$ transformed OFDM signal vectors $x^1(k), x^2(k), ..., x^{N_T}(k)$ may be minimized by using the relationships between the various transforms. FIG. 1A shows the flow diagram for the computation of transformed OFDM signal vectors $x^1(k), x^2(k), x^3(k)$, and $x^4(k)$ for the case of $N_T$=4 transforms, comprised of the identity transform, DHT, WHT and the DCT transforms so as to minimize the total number of computations. Referring to FIG. 1A, the modulation symbol vector X(k) appears at the node 50 of FIG. 1A. The link 145 computes the IFFT of X(k) providing the transformed OFDM signal vector $x^1(k)$ at the node 150. The link 155 directly connects the node 150 to the output node 75-1 via the identity transform I providing the first transformed OFDM signal vector $x^1(k)$.

Referring to FIG. 1A, the link 160 connected to node 150 evaluates the DHT of X(k) from the transformed OFDM signal vector $x^1(k)$ using the IFFT→DHT transform relationship providing transformed symbol vector $X^2(k)$ at the node 65-2. The link 165 evaluates the IFFT of $X^2(k)$ providing the transformed OFDM signal vector $x^2(k)$ at the node 75-2.

Referring to FIG. 1A, the link 170 connected to the node 150 evaluates the WHT of X(k) from the transformed OFDM signal vector $x^1(k)$ using the IFFT→WHT transform relationship providing the transformed symbol vector $X^3(k)$ at the node 65-3. The link 175 connected to the node 65-3 evaluates the IFFT of $X^3(k)$ providing the transformed OFDM signal vector $x^3(k)$ at the node 75-3. Referring to FIG. 1A, the link 180 connected to the node 50 evaluates the DCT of X(k) providing the transformed symbol vector $X^4(k)$ at the node 65-4. The link 185 connected to the node 65-4 evaluates the IFFT of $X^4(k)$ providing the transformed OFDM signal vector $x^4(k)$ at the node 75-4.

Referring to FIG. 1, the $N_T$ transformed OFDM signal vectors $x''(k)$ 75$a, b, \ldots, N_T$ $x''(k)$ are inputted to the minimum PAPR (Peak to Average Power Ratio) evaluator block 80. The minimum PAPR evaluator block 80 evaluates the PAPR ratio for the transformed OFDM signal vectors $x''(k)$ by (11).

$$PAPR_n = \frac{\max_m |x_m^n(k)|^2}{\|x^n(k)\|^2 / N}; n = 1, 2, \ldots, N_T \tag{11}$$

In (11) $x_m''(k)$ denotes the $m^{th}$ element of the transformed OFDM signal vectors $x''(k)$, and the denominator in (11) is an estimate of the average power present in the elements of the vector $x''(k)$. The minimum PAPR evaluator block 80 minimizes the $PAPR_n$ over the index n and provides the minimizing index 85 $n_0$ to the input selector block 90. For any orthonormal transform matrix P and any complex valued vector □□ the norm of the transformed vector is equal to the norm of the vector □□ as may be inferred from (12).

$$\|P\chi\|^2 = (P\chi)^H P\chi \tag{12}$$
$$= \chi^H P^H P\chi$$
$$= \chi^H \chi$$
$$= \|\chi\|^2$$

From the orthonormal properties of the transform matrices $P''$ and the IFFT matrix $P^F$ it follows that the norm of all the transformed OFDM signal vectors $x''(k)$, $n=1, 2, \ldots, N_T$ are all equal with $$\|x''\|^2 = \|x'''\|^2; n,m=1,2,\ldots,N^T \tag{13}$$

From (13) it follows that the denominator term in (11) is independent of n and the $PAPR_n$ may be minimized equivalently by (14) and thereby minimizing the computational requirement in the evaluation of the minimizing index $n_0$.

$$\min_n \left\{ \max_m [|x_m^n(k)|] \right\} \tag{14}$$

Referring to FIG. 1, the transformed OFDM signal vectors 75 $x''(k)$, $n=1, 2, \ldots, N_T$ are inputted to the input selector block 90 that provides the transformed OFDM signal vector with index $n_0$ 95 $x^{n_0}(k)$ to the parallel to serial converter block 100.

In various embodiments of the invention the number of orthonormal transforms may be greater than 4. The increased number of transforms may be obtained, for example, by the appropriate cascades of the WHT, DCT and DHT transforms with the corresponding matrices $P^W$, $P^C$, and $P^H$. For any pair orthonormal matrices $P^1$ and $P^2$ one obtains $$(P^1 P^2)^{-1} = (P^2)^{-1}(P^1)^{-1} = P^{2H} P^{1H} = (P^1 P^2)^H \tag{15}$$

From (15) the product of any two orthonormal matrices is also orthonormal. As an example of $N_T=16$ orthonormal transforms, Table 1 lists 16 distinct transforms obtained by the cascades of the transforms selected from the basic group of transforms comprised of the WHT, DCT and DHT transforms.

TABLE 1

Indices of the transforms ($N_T = 16$)

| Index | Transform |
|---|---|
| 1 | I |
| 2 | DHT |
| 3 | DCT |
| 4 | WHT |
| 5 | DHT*DCT |
| 6 | DHT*WHT |
| 7 | DCT*DHT |
| 8 | DCT*WHT |
| 9 | WHT*DHT |
| 10 | WHT*DCT |
| 11 | DHT*DCT*WHT |
| 12 | DHT*WHT*DCT |
| 13 | DCT*DHT*WHT |
| 14 | DCT*WHT*DHT |
| 15 | WHT*DHT*DCT |
| 16 | WHT*DCT*DHT |

Referring to FIG. 1, the transformed symbol vector (PX) for any matrix $P = P^1 P^2 P^3$ where $P^1$, $P^2$, and $P^3$ are any of the matrices $P^H$, $P^W$, $P^C$ may be obtained by successively multiplying X by the matrices $P^1$, $P^2$, and $P^3$ as in (16).

$$PX = P^1(P^2(P^3 X)) \tag{16}$$

In (16), each multiplication by the matrix $P^i$, $i=1, 2, 3$ may be performed by the use of fast transform algorithms. Referring to FIG. 1 and Table 1, it may be inferred that the sequence of computations of the $N_T$ transformed symbol vectors $X''(k)$ may be so arranged such that each of the $N_T$ transforms requires only 1 additional fast transform algorithm application as, for example, in the computation of $P^1 P^2(P^3(X))$, the transformed symbol vector $P^2(P^3(X))$ may be already available and so on. The total computational requirement in the evaluation of the $N_T$ transformed symbol vectors $X''(k)$ is of the order $N_T$ N $\log_2(N)$. The relationship among the IFFT, DWT, DCT and DHT transforms may also be used for the more general case of $N_T$ to further reduce the total computational requirements as illustrated by FIG. 1A for the specific case of $N_T=4$.

Referring to FIG. 1, the parallel to serial converter 100 arranges the elements of the transformed OFDM signal vector $x^{n_0}(k)$ into a serial stream generating the serial OFDM signal 105 $g_s(n)$. From the Fourier transform relationship (9), (10) the OFDM signal $g_s(n)$ may be expressed as $$g_s(n) = \frac{1}{\sqrt{N}} \sum_{m=1}^{N} X_m^{n_0}(k) \exp[j2\pi(m-1)(i-1)/N]; \tag{17}$$

$$n = kN + i; i = 1, 2, \ldots, N; k = 0, 1, \ldots$$

Referring to FIG. 1, the OFDM signal 105 $g_s(n)$ is inputted to the guard interval insertion block 110 that introduces a guard band of $N_G$ samples between each block of N samples of $g_s(n)$ to protect against multipath distortion, by the cyclic extension of the N samples block of $g_s(n)$ generating the signal 115 $g_{se}(n)$ given by (18).

$$g_{se}(n) = \frac{1}{\sqrt{N}} \sum_{m=1}^{N} X_m^{n_0}(k) \exp[j2\pi(m-1)(i-1)/N]; \tag{18}$$

$$n = k(N + N_G) + i; i = -N_G + 1, \ldots, N; k = 0, 1, \ldots$$

Referring to FIG. 1, the signal 115 $g_{se}(n)$ is inputted to the band limiting filter block 120. The band limiting filter block may comprise of convolving the signal $g_{se}(n)$ with a discrete time band limiting filter impulse response. For example, the band limiting filter may be a square root raised cosine filter. The resulting band limited discrete time signal is converted into the analog form by a digital to analog converter that may be component of the band limiting filter block 120 generating the OFDM analog baseband signal gSe (t). For the specific case of no band limiting filtering, the OFDM analog baseband signal gse (t) is given by $$\bar{g}_{se}(t) = \sum_{k=-\infty}^{\infty} p_{T_{0e}}(t - kT_{0e}) \left\{ \frac{1}{\sqrt{N}} \sum_{m=1}^{N} X_m^{n_0}(k) \exp[j2\pi f_m t] \right\} \quad (19)$$

In (19) $T_{0e}=(N+N_G)T_S$ with $T_S$ denoting the OFDM sampling period of the signal 115 $g_{se}(n)$, $f_m=(m-1)\Delta f$, $m=1, 2, \ldots, N$ and $\Delta f=1/T_0$ with $T_0=NT_S$ making the subcarriers $\exp[j2\pi f_m t]$ orthogonal over the period $T_0$. In (19), $p_{T_{0e}}(t)$ is the basic pulse shape that for the specific case of rectangular shape is given by (20).

$$p_{T_{0e}}(t) = 1/\sqrt{T_{0e}}; -T_G \leq t \leq T_0 \quad (20)$$

As may be inferred from (19) the $m^{th}$ element of the transformed symbol vector $X^{n_0}(k)$ modulates the subcarrier exp $[j2\pi f_m t]$ for $m=1, 2, \ldots, N$ with the frequency spacing among the subcarriers equal to $\Delta f=1/T_0$.

Referring to FIG. 1, the OFDM analog baseband signal 125 $\bar{g}_{se}(t)$ is inputted to the carrier modulator block 130 that modulates the signal $\bar{g}_{se}(t)$ by the carrier signal generating the OFDM band pass signal v(t) given by $$v(t) = Re\{\bar{g}_{se}(t) \exp[j2\pi f_c t]\} \quad (21)$$

In (21) $f_c$ denotes the carrier frequency. The OFDM band pass signal v(t) may be amplified by an RF (radio frequency) power amplifier and transmitted by a transmit antenna not shown in FIG. 1. In various other embodiments of the invention, the OFDM analog baseband signal may be first modulated by an intermediate frequency (IF) carrier with the IF modulated signal up converted to the desired RF carrier frequency $f_c$.

Referring to FIG. 1, during the OFDM frame period $T_{0e}$, number of information baseband symbols 30 s(k) transmitted is N resulting in an average baseband symbol transmission rate of $(N/T_{0e})=1/[T_S(1+T_G/T_0)]$. The N information baseband symbols 30 are processed by the OFDM system of FIG. 1 during the period $T_0$ with the insertion of a guard interval of $T_G$ sec. Referring to FIG. 1, a dynamic buffer, not shown, may be included between the baseband modulator 20 and the S/P converter 40 for the proper rate conversion.

Referring to FIG. 1, $N_P$ of the N symbols may be used for the purpose of transmission of pilot signals, not shown, used for the subcarrier synchronization purposes wherein during the period $T_0$, $N_I=(N-N_p)$ baseband symbols are inputted to the S/P converter 30 with the $N_P$ elements of the modulation symbol vector 50 X(k) selected to be the pilot symbols resulting in an average baseband symbol transmission rate of $(N/T_{0e})=(N_I/N)/[T_S(1+T_G/T_0)]$.

Referring to FIG. 1, the optimum transform index 85 $n_0$ may be transmitted to the receiver over a side information channel, not shown. Such a side information channel may, for example, comprise of a frequency band adjacent to the OFDM signal band with appropriate bandwidth for transmission of the index $n_0$. An appropriate modulation and coding may be used for the transmission. For example with $N_T=16$, a 64-QAM modulation may be used wherein only 16 out of 64 signal constellation points are used for the transmission of 1 out of $N_T$ indices so as to maximize the minimum distance among the 16 selected constellation points.

The multiple transform system of the invention may be modified with the dummy symbols insertion resulting in the multi transform-DSI OFDM system, also referred to as the OFDM-Pc-DSI system for the PAPR reduction. In the OFDM-Pc-DSI system the modulation symbol vector X(k) is comprised of $N_D$ dummy symbols and $N_I=N-N_D$ information symbols. The dummy symbols may correspond to $N_D$ randomly selected but fixed indices of the vector X(k), for example, the first $N_D$ elements may be the dummy symbols.

Figure 2:
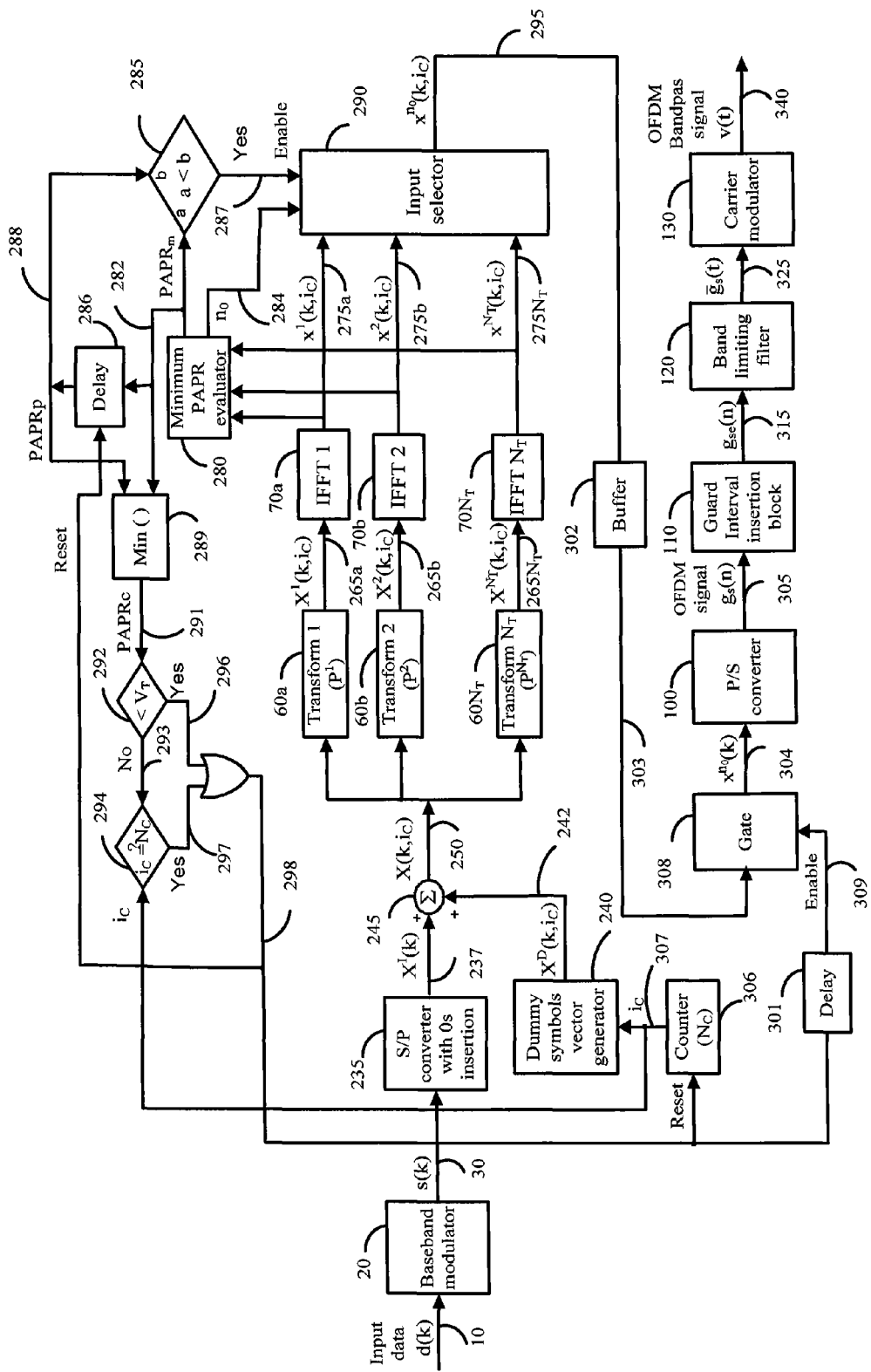
FIG. 2 shows a block diagram of one embodiment of multi transform-DSI OFDM transmitter system.

FIG. 2 shows the block diagram of one of the various embodiments of the OFDM-Pc-DSI system. Referring to the block diagram of the multi transform-DSI OFDM transmitter system 2 in FIG. 2, the user input data 10 d(k) that may be binary valued taking possible values 0 and 1, wherein k denotes the discrete time, is inputted to the baseband modulator 20. The baseband modulator segments the user input data into groups of m binary valued data bits and maps each of the groups of the m binary data bits into one of the $M=2^m$, in general complex valued, information baseband symbols 30 s(k) with m selected equal to an integer greater than or equal to 1. The one to one mapping of the groups of m binary valued data bits into the corresponding baseband symbol may be based on any of the baseband modulation techniques, selected, for example, from the set of the MQAM (M'ary Quadrature Amplitude Modulation), the MPSK (M'ary Phase Shift Keying), and the MASK (M'ary Amplitude Shift Keying) modulation techniques.

Referring to FIG. 2, the information baseband symbols 30 s(k) are inputted to the serial to parallel converter with 0s insertion block 235. The serial to parallel converter with 0s insertion block 235 collects $N_I$ consecutive baseband symbols 30 s(k) and places them in the selected $N_I$ elements of the information symbol vector 237 $X^I(k)$ of dimension N and inserts 0s in the remaining $N_D=N-N_I$ elements of the information symbol vector $X^I(k)$. For example, with $N_D=1$ and the position of the information baseband symbols selected to be the last $N_I$ elements of the information symbol vector 237, $X^I(k)$ is given by $$X^I(k) = [0\,s(k1)\,s(k1+1) \ldots s(k1+N_I-1)]^T; k1 = kN_I+1; \\ k=0,1,\ldots \quad (22)$$

Referring to FIG. 2, the dummy symbol vector generator block 240 generates the dummy symbol vector $X^D(k, i_C)$ of size N with its element positions assigned to the dummy symbols set equal to the dummy symbols and the remaining $N_I$ positions set equal to 0. The selection of the dummy symbols depends upon the iteration count $i_C$ provided to the dummy symbol vector generator block 240 by the counter 306 and the selection algorithm used in the dummy symbol vector generator block 240. For example, with $N_D=1$ and the position of the dummy symbol selected to be the first element of the dummy symbol vector 242, $X^D(k, i_C)$ is given by $$X^D(k, i_C) = [s_D(k, i_C) 0 \ldots 0]^T \quad (23)$$

In (23) $s_D(k, i_C)$ is the dummy symbol selected at time k and iteration count $i_C$.

Referring to FIG. 2, the information symbol vector 237 $X^I(k)$ and the dummy symbol vector 242 $X^D(k, i_C)$ are added by the adder 245 generating the modulation symbol vector 250 $X(k, i_C)$. The modulation symbol vector 250 $X(k, i_C)$ is inputted to the transform blocks 60a, b, ..., $N_T$. The $N_T$ transform blocks transform the modulation symbol vector X(k, $i_C$) by $N_T$ different transforms providing the $N_T$ transformed symbol vectors 265a, b, . . . , $N_T$ $X^I$(k, $i_C$), $X^2$(k, $i_C$), . . . , $X^{NT}$(k,$i_C$) at the outputs, wherein $$X^n(k,i_C)=P^n X(k,i_C); n=1,2,\ldots,N_T; k=0,1,2,\ldots \quad (24)$$

In (24) $P^n$ for n=1, 2, . . . , $N_T$ are some appropriately selected N×N nonsingular matrices. In various embodiments of the invention, the matrices $P^n$, n=1, 2, . . . , $N_T$, may be selected to be some orthonormal matrices. For example, for the case of $N_T \le 16$, the orthonormal matrices may be selected from the matrices corresponding to the transforms listed in Table 1. For values of $N_T > 16$, appropriate additional cascades of the WHT, WCT, and DHT transforms of length 3 or more may be added to those listed in Table 1.

Referring to FIG. 2, the transformed symbol vector 265n $X^n$(k, $i_C$) is inputted to the respective IFFT block 70n providing the transformed OFDM signal vector 275n $x^n$(k, $i_C$) at the output for n=1, 2, . . . , $N_T$. The IFFT block 70n evaluates the N point inverse Fourier transform of the input 265n with the output 75n $x^n$(k, $i_C$) related to $X^n$(k, $i_C$) by $$x^n(k,i_C)=P^F X^n(k,i_C); n=1,2,\ldots,N_T; k=0,1,2,\ldots \quad (25)$$

In (25) $P^F$ is the inverse Fourier transform matrix given by (10).

Referring to FIG. 2, the $N_T$ transformed OFDM signal vectors $x^n$(k, $i_C$) 275a, $N_T x^n$(k) are inputted to the minimum PAPR (Peak to Average Power Ratio) evaluator block 280. The minimum PAPR evaluator block 280 evaluates the PAPR ratio for the transformed OFDM signal vectors $x^n$(k, $i_C$) by (26).

$$PAPR_n = \frac{\max_m |x_m^n(k, i_C)|^2}{\|x^n(k, i_C)\|^2/N}; n = 1, 2, \ldots, N_T \quad (26)$$

In (26) $x_m^n$(k, $i_C$) denotes the $m^{th}$ element of the transformed OFDM signal vectors $x^n$(k, $i_C$), and the denominator in (26) is an estimate of the average power present in the elements of the vector $x^n$(k, $i_C$). The minimum PAPR evaluator block 280 minimizes the $PAPR_n$ over the index n and provides the minimizing index 284 $n_0$ to the input selector block 290. In various embodiments of the invention, the PAPR may be minimized by (27) and thereby minimize the computational requirement in the evaluation of the minimizing index $n_0$.

$$\min_n \left\{ \max_m [|x_m^n(k, i_C)|] \right\} \quad (27)$$

Equivalently the min max optimization in (27) may be performed on $|x_m^n(k,i_C)|^2$. Referring to FIG. 2, the minimum PAPR evaluator block 280 evaluates the PAPR from (26) for n equal to the minimizing index $n_0$ given by (28), and makes it available to the decision block 285.

$$PAPR_m = \frac{\max_m |x_m^{n_0}(k, i_C)|^2}{\|x^{n_0}(k, i_C)\|^2/N} \quad (28)$$

Referring to FIG. 2, the PAPR for the index $n_0$ 282 $PAPR_m$ is inputted to the delay 286 and the minimum function block 289. The delay block 286 stores the value of $PAPR_m$ at the previous value of count $i_C$ and is reset to some very high value at the start of the counter 306 by the reset input 298. Referring to FIG. 2, the output 288 of the delay block 286 $PAPR_p$ is inputted to the minimum function block 289 and the decision block 285. The decision block 285 compares the input 282 $PAPR_m$ with the input 288 $PAPR_p$. The output 287 of the decision block 285 is connected to the enable input of the input selector block 290. If $PAPR_m < PAPR_p$, the output 287 of the decision block 285 is activated and enables the input selector block 290. If $PAPR_m \ge PAPR_p$ the output 287 of the decision block 285 is not activated and the input 287 of the selector block 290 remains disabled.

Referring to FIG. 2, when the input 287 of the selector block 290 is enabled, the selector block 290 selects one of the $N_T$ inputs 275 $x^n$(k, $i_C$) corresponding to the index n=$n_0$ with the output 295 of the selector block equal to $x^{n_0}$(k, $i_C$).

Referring to FIG. 2, the output 295 $x^{n_0}$(k, $i_C$) of the input selector block 290 is inputted to the buffer 302 that stores the output 295 until the output 295 is changed again by enabling the input 287 of the input selector block 290. The enable input 287 is also connected to the buffer enable input, not shown, so that the contents at the input to the buffer 302 are stored whenever the enable input 287 is logic 1.

Referring to FIG. 2, the minimum function block 289 selects the minimum of the input 282 $PAPR_m$ and the input 288 $PAPR_p$ and makes the output 291 $PAPR_c$=min($PAPR_m$, $PAPR_p$) available to the decision block 292. The decision block 292 compares the input $PAPR_c$ with a threshold $V_T$. In some embodiments of the invention the threshold $V_T$ may be set equal to 0. When the threshold $V_T$ is equal to 0, the condition $PAPR_c < V_T$ is not satisfied and the output 293 of the decision block is equal to logic 1 with the output 296 equal to logic 0.

Referring to FIG. 2, the count 307 $i_C$ of the counter 306 is inputted to the decision block 294. The counter 306 after being reset with the reset input 298 counts between 1 to $N_C$. Referring to FIG. 2, when the input 293 of the decision block 294 is logic 1, the decision block 294 compares the count 307 $i_C$ with $N_C$. If $i_C = N_C$, the output 297 of the decision block 297 is equal to logic 1 otherwise the output 297 is equal to logic 0. Referring to FIG. 2, the output 296 of the decision block 292 and the output 297 of the decision block 294 are both connected to the inputs of the logic OR gate 295. The output 298 of the logic OR gate 295 is equal to logic 1 when either of the two inputs 296 or 297 is equal to 1. With $V_T$ set equal to 0, the logic output 298 is 1 if and only if the condition $i_C = N_C$.

Referring to FIG. 2, the logic output 298 is connected to the reset inputs of the counter 306 and the delay 286 thereby resetting the counter and the delay 286 to their respective initial states. With $V_T$ set to 0, the same number $N_C$ of dummy sequences is examined and the one providing the minimum PAPR is finally selected.

In various embodiments of the invention the threshold $V_T$ may be set equal to some appropriately selected non zero value that is expected to be satisfied by the OFDM-Pc-DSI system. For example, the complementary cumulative distribution function (CCDF) plots of the PAPR (dB) may be obtained by simulations for the case of $V_T$=0, i.e., with exhaustive search over the $N_C$ number of sequences of the dummy symbols for the OFDM-Pc-DSI system. The CCDF plot of the standard OFDM system that corresponds to the case of identity transform with the dummy sequence set equal to 0 is obtained as well by simulations. For any information symbol vector $X^I$(k) the PAPR of its inverse Fourier transform denoted by $PAPR_0$ is evaluated and the corresponding value of the CCDF denoted by $CCDF_0$ from the CCDF plot for the standard OFDM system is obtained. The expected value of the PAPR for the OFDM-Pc-DSI system is the value of the PAPR obtained from the CCDF plot for the OFDM-Pc-DSI system corresponding to the CCDF value of $CCDF_0$. Denoting this value by $CCDF_{opt}$ the threshold $V_T$ may be selected equal to ($CCDF_{opt}+\epsilon$) with $\epsilon$ selected to be some small positive number, for example $\epsilon=0.1$ dB. With the selection of nonzero value for $V_T$, the output 298 is logic 1 when the value of the $PAPR_c$ is smaller than the threshold value $V_T$ or the number of iterations $i_C$ on the selection of the dummy sequence $X^D(k, i_C)$ is equal to $N_C$. With the selection of nonzero value for $V_T$, the number of iterations $i_C$ on the selection of the dummy sequence is variable bounded by $N_C$. In some embodiments of the invention the threshold $V_T$ may be set equal to some appropriately selected non zero constant.

Referring to FIG. 2, the reset input 298 is inputted to the delay 301 providing the enable input 309 to the gate 308. The delay 301 compensates for the delay introduced by the buffer. At the end of the dummy sequence selection process that occurs when either $i_C=N_C$ or $PAPR_c<V_T$, the contents of the buffer 301 are transferred to the output 304 $x''^o(k)$ of the gate 308.

Referring to FIG. 2, the transformed OFDM signal vector 304 $x''^o(k)$ is inputted to the cascade of the parallel to serial converter 100, guard interval insertion block 110, the band limiting filter 120, and the carrier modulator 130 providing the OFDM band pass signal 340 $v(t)$ at the output of the carrier modulator 130. The operation of the cascade of the blocks 100, 110, 120, and 130 is identical to that described with reference to FIG. 1. For the case of variable number of iterations of the dummy sequence selection corresponding to a nonzero threshold $V_T$, a dynamic buffer, not shown, may be present between the output 304 and the parallel to serial converter 100 so as to equalize for the variable delay introduced by the dummy sequence selection process. The OFDM band pass signal 340 $v(t)$ may be connected to the cascade of RF power amplifier and antenna, not shown, for the transmission of the OFDM signal.

In various embodiments of the invention, one of the various possible methods for the selection of the number of dummy sequences $N_C$, the set of dummy sequences and the order in which the dummy sequences from the set are selected, may be used. For example, in one such method, the number $N_C$ may be set equal to $N_C=M^{N_D}$ where M is the order of modulation equal to the number of symbols in the signal constellation of the baseband modulator 20 and $N_D$ is the number of dummy symbols. In alternative embodiments of the invention, the number $N_C$ may be set equal to $N_C=(N_W)^{N_D}$ where $N_W$ is the number of points in an appropriately selected subset of the symbols in the signal constellation of the baseband modulator 20. For example, $N_W$ may be selected equal to 4 corresponding to the 4 corner points of the signal constellation diagram irrespective of M. Simulation results performed on the OFDM-$P_c$-DSI system have shown that the $N_D$ value of higher than 1 provides only very marginal improvement over the case of $N_D=1$. In various embodiments of the invention, the number $N_C$ may be set to a value between 4 and M.

For the case of threshold $V_T$ selected equal to 0, the selection of the dummy sequence over the set of $N_C$ dummy sequences is done in an exhaustive manner and thus the order in which the dummy sequence is selected from the set may be arbitrarily selected. In the embodiments of the invention employing a nonzero $V_T$ the order of selection of the dummy sequence may be optimized so as to minimize the average number of iterations of the dummy sequence selection. For example, the histogram of the optimum dummy sequence selected may be obtained from simulations with $V_T$ set equal to 0 and the selection of the dummy sequence may proceed from the most probable sequence to the least probable sequence resulting in minimum value of the average number of iterations of the dummy sequence selection.

Referring to FIG. 2, the selection over the set of $N_T$ transforms and $N_D$ dummy sequences is performed in a sequential manner by minimizing the PAPR over the $N_T$ transforms for any of the selected dummy sequence and repeating the process over the $N_D$ dummy sequences to obtain an overall optimum transform and dummy sequence. In alternative embodiments of the invention, the procedure may be reversed by minimizing the PAPR over the dummy sequences for one of the $N_T$ transforms and repeating the procedure over the $N_T$ transforms. Both the order of selection of the transform and that of dummy sequence may be performed on the basis of their respective histograms obtained by, for example, simulations performed with $V_T$ set equal to 0 and the search performed exhaustively over both the $N_T$ transforms and $N_D$ dummy sequences, so as to minimize the overall average computational requirements.

The computational requirements of the optimum transform—DSI method can be significantly reduced by an appropriate organization of the computations. The transformed OFDM signal vector $x''(k)$ may be expressed as $$x''(k) = P^F P^n X(k) \qquad (29a)$$
$$= P^F P^n X^I(k) + P^F P^n X^D(k)$$

With $j_1, j_2, \ldots, j_{N_D}$ denoting the indices of the vector $X(k)$ corresponding to the dummy symbols, the vector $x''(k)$ may be expressed as $$x''(k) = P^F P^n X^I(k) + P^F P_S^n y_D(k) \qquad (29b)$$
$$= P^F P^n X^I(k) + P_D^n y_D(k)$$

In (29b) $y_D$ is the vector of length $N_D$ with its elements equal to the dummy symbols and $P_S''$ is the $(N \times N_D)$ sub matrix of $P''$ comprised of the $N_D$ columns of the matrix $P''$ with indices $j_1, j_2, \ldots, j_{N_D}$, i.e., the matrix $P_S''$ is given by $$P_S'' = [\, P_{j_1}''\ P_{j_2}''\ \cdots\ P_{j_{N_T}}''\,] \qquad (30)$$

and $P_D''$ denotes the matrix with its columns equal to the inverse Fourier transforms of $P_{j_i}''$; i=1, 2, ..., $N_D$. In (30) $P_j''$ denotes the $j^{th}$ column of the matrix $P''$ for any integer j. For the specific case of $N_D=1$, the OFDM signal vector $x''(k)$ may be expressed as $$x''(k) = P^F P^n X^I(k) + p^{Fn} s_D(k) \qquad (31)$$

In (31) $s_D(k)$ denotes the dummy symbol and $p^{Fn}$ is a column vector given by the Fourier transform of the $j^{th}$ column of $P''$ wherein j is the index of the dummy symbol in the OFDM symbol vector $X(k)$. The vector $p^{Fn}$ may be pre computed and stored for use in the real time application. Thus the change of the dummy symbol requires just the multiplication of a fixed vector $p''$ by the selected symbol for the selected transform matrix $P''$, rather than requiring an N point IFFT and orthonormal transform computation for each symbol selection and each value of n resulting in considerable saving in the computational requirements.

The information about the selected transform index n may be imbedded into the OFDM signal by using one or more symbols of the OFDM frame for this purpose. For the case wherein the order of modulation M is greater than equal to 64 and the number of transforms $N_T$ is less than or equal to 16, one symbol is adequate for carrying this information. In fact for M≥64, significant error correction coding on the transform index may be used to protect against error. Using one symbol for carrying the information about the index n, the number of zeros in the vector $X^I(k)$ is made equal to $(N_D+1)$. Assuming that the information about the index n is contained in the elements $i_1, i_2, \ldots, i_{N_i}$ of the modulation symbol vector $X(k)$, the vector to be added to the modified information signal vector $x^{I,n}(k)$, equal to the IFFT of the $X^{In}(k)=P^n X^I(k)$, is given by $$q^n = P^F P_i^n \bar{s}^n \qquad (32)$$

In (32) $P_i^n$ denotes the $(N \times N_i)$ sub matrix of $P^n$ comprised of the columns $i_1, i_2, \ldots, i_{N_i}$ of the transform matrix $P^n$ and $\bar{s}^n$ is the vector of dimension $N_i$ comprised of the OFDM symbols used to transmit the index n. For example, with $N_i=1$ and $i_1=1$, the vector $q^n$ is given by $$q^n = P^F p_1^n s_i^n \qquad (33)$$

In (33) $p_1^n$ denotes the first column of the transform matrix $P^n$ and $s_i^n$ is the OFDM symbol used to transmit the transform index n.

Figure 3:
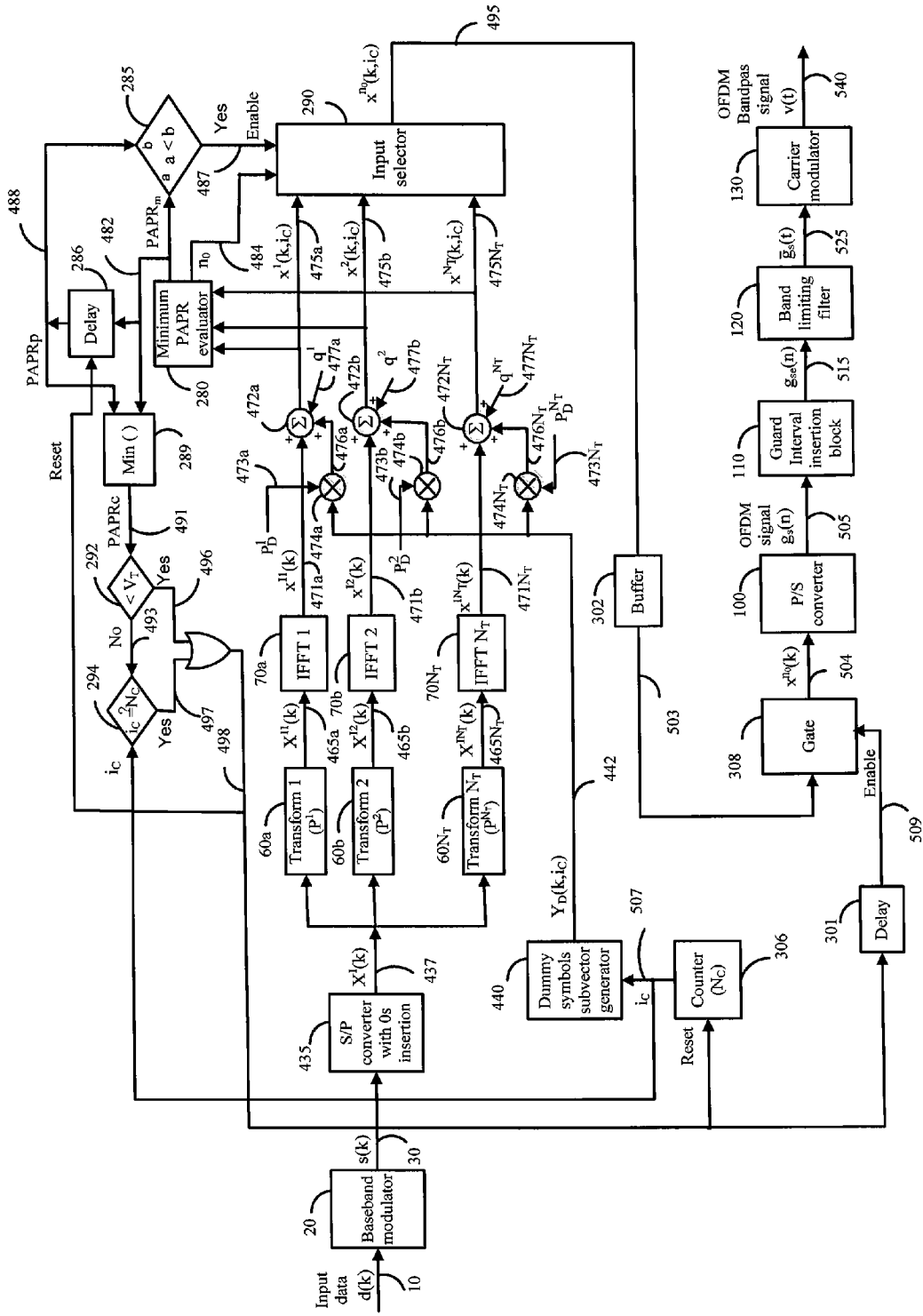
FIG. 3 shows a block diagram of one embodiment of multi transform-DSI OFDM transmitter system.

FIG. 3 shows the block diagram of an embodiment of the invention for the computationally efficient OFDM-Pc-DSI method. Referring to the block diagram of the multi transform-DSI OFDM transmitter system 3 in FIG. 3, the baseband symbols 30 s(k) are inputted to the serial to parallel converter with 0s insertion block 435. The serial to parallel converter with 0s insertion block 435 collects $N_I$ consecutive baseband symbols 30 s(k) and places them in the selected $N_I$ elements of the information symbol vector 437 $X^I(k)$ of dimension N and inserts 0s in the remaining $N_D+N_i=N-N_I$ elements of the information symbol vector $X^I(k)$ with $N_i$ equal to the number of elements of the modulation symbol vector $X(k)$ needed for the transmission of the transform index n.

For example, with $N_D=1$ and $N_i=1$ and the position of the information baseband symbols selected to be the last $N_I$ elements of the information symbol vector 437, $X^I(k)$ is given by $$X^I(k) = [0\,0\,s(k1)\,s(k1+1)\ldots s(k1+N_I-1)]^T; \; k1 = kN_I+1; \\ k=0,1,\ldots \qquad (32)$$

Referring to FIG. 3, the dummy symbol sub vector generator block 440 generates the dummy symbol vector $Y^D(k, i_C)$ of size $N_D$ with its element set equal to the dummy symbols. The selection of the dummy symbols depends upon the iteration count $i_C$ provided to the dummy symbol vector generator block 440 by the counter 306 and the selection algorithm used in the dummy symbol vector generator block 440.

Referring to FIG. 3, the information symbol vector 437, $X^I(k)$ is inputted to the transform blocks 60a, b, ..., $N_T$. The $N_T$ transform blocks transform the information symbol vector $X^I(k)$ by $N_T$ different transforms providing the $N_T$ transformed information symbol vectors 465a, b, ..., $N_T X^{I1}(k)$, $X^{I2}(k), \ldots, X^{IN_T}(k)$ at the outputs, wherein $$X^{In}(k) = P^n X^I(k); n=1,2,\ldots, N_T; k=0,1,2,\ldots \qquad (33)$$

In (33) $P^n$ for n=1, 2, ..., $N_T$ are some appropriately selected N×N nonsingular matrices. In various embodiments of the invention, the matrices $P^n$, n=1, 2, ..., $N_T$, may be selected to be some orthonormal matrices. For example, for the case of $N_T \leq 16$, the orthonormal matrices may be selected from the matrices corresponding to the transforms listed in Table 1. For values of $N_T > 16$, appropriate additional cascades of the WHT, WCT, and DHT transforms of length 3 or more may be added to those listed in Table 1.

Referring to FIG. 3, the transformed information symbol vector 465n $X^{In}(k)$ is inputted to the respective IFFT block 70n providing the transformed OFDM information signal vector 471n $x^{In}(k)$ at the output for n=1, 2, ..., $N_T$. The IFFT block 70n evaluates the N point inverse Fourier transform of the transformed information symbol vector 465n $X^{In}(k)$ with the output 471n $x^{In}(k)$ related to $X^{In}(k)$ by $$x^{In}(k) = P^F X^{In}(k); n=1,2,\ldots, N_T; k=0,1,2,\ldots \qquad (34)$$

In (34) $P^F$ is the inverse Fourier transform matrix given by (10). Referring to FIG. 3, the transformed OFDM information signal vector 471n $x^{In}(k)$ is inputted to the respective adder 472n for n=1, 2, ..., $N_T$. Referring to FIG. 3, the matrix $P_D^n$ 473n given by (29)-(30) is inputted to the multiplier 474n. The other input of the multiplier 474n is connected to the dummy symbols sub vector 442 $Y_D(k, i_C)$ generated by the dummy symbols sub vector generator 440. The multiplier 474n multiplies the dummy symbols sub vector 442 $Y_D(k, i_C)$ by the matrix $P_D^n$ 473n providing the product 476n to the adder 472n for n=1, 2, ..., $N_T$. Referring to FIG. 3, the vector $q^n$ 477n given by (32)-(33) is inputted to the adder 472n. The adder 472n sums the inputs 471n, 476n, and 477n providing the transformed OFDM signal vector $x^n(k, i_C)$ 475 n at the output of the adder 472n for n=1, 2, ..., $N_T$.

Referring to FIG. 3, the transformed OFDM signal vectors $x^n(k, i_C)$ 475 n, n=1, 2, ..., $N_T$ are inputted to the input selector 290. The input selector 290 is provided with the transform index 484 $n_0$ by the minimum PAPR evaluator block 280 and the enable input 487 of the input selector 290 is connected to the output of the decision block 285. When the enable input 487 is equal to logic 1, the input selector 290 selects one of the inputs 475 corresponding to the index n=$n_0$ and makes the output 495 $x^{n_0}(k, i_C)$ to the buffer 302. The enable input 487 is also connected, not shown, to the buffer 302 enabling the storage of the buffer input whenever the input 487 has a value of logic 1.

Referring to FIG. 3, the operation of the minimum PAPR evaluator block 280, the decision blocks 285, 294, and 292, the minimum function block 289 and the delay block 286 to generate the enable signal 487 and the optimum transform index 484 $n_0$ are as explained with reference to FIG. 2 and results in the selection of the dummy symbols sub vector $Y_D(k, i_C)$ out of the $N_C$ possible vectors, and the selection of the transform matrix $P^n$ out of the $N_T$ possible transform matrices to provide the minimum possible value of the PAPR.

The embodiment of FIG. 3 requires only $N_T$ number of orthonormal transforms and IFFTs irrespective of the number $N_C$ of possible dummy sequences resulting in a very significant reduction in the computational requirements over that of FIG. 2. Additionally, the embodiment of FIG. 3 does not require any side information channel for the transmission of the index $n_0$ of the optimum transformation matrix $P^n$.

Referring to FIG. 3, the output 503 of the buffer 302 is inputted to the gate 308. The enable input 509 of the gate 308 is connected to the delayed reset input 498. The reset input tales value logic 1 at the end of the dummy sequence selection process and enables the gate 302 to connect the input 503 to the output 504 $x^{n_0}(k)$.

Referring to FIG. 3, the optimum transformed OFDM signal vector 504 $x^{n_0}(k)$ is inputted to the cascade of the parallel to serial converter 100, guard interval insertion block 110, the band limiting filter 120, and the carrier modulator 130 providing the OFDM band pass signal 540 v(t) at the output of the carrier modulator 130. The operation of the cascade of the blocks 100, 110, 120, and 130 is identical to that described with reference to FIGS. 1 and 2. For the case of variable number of iterations of the dummy sequence selection corresponding to a nonzero threshold $V_T$, a dynamic buffer, not shown, may be present between the output 504 and the parallel to serial converter 100 so as to equalize for the variable delay introduced by the dummy sequence selection process. The OFDM band pass signal 540 v(t) may be connected to the cascade of RF power amplifier and antenna, not shown, for the transmission of the OFDM signal.

Figure 4A:
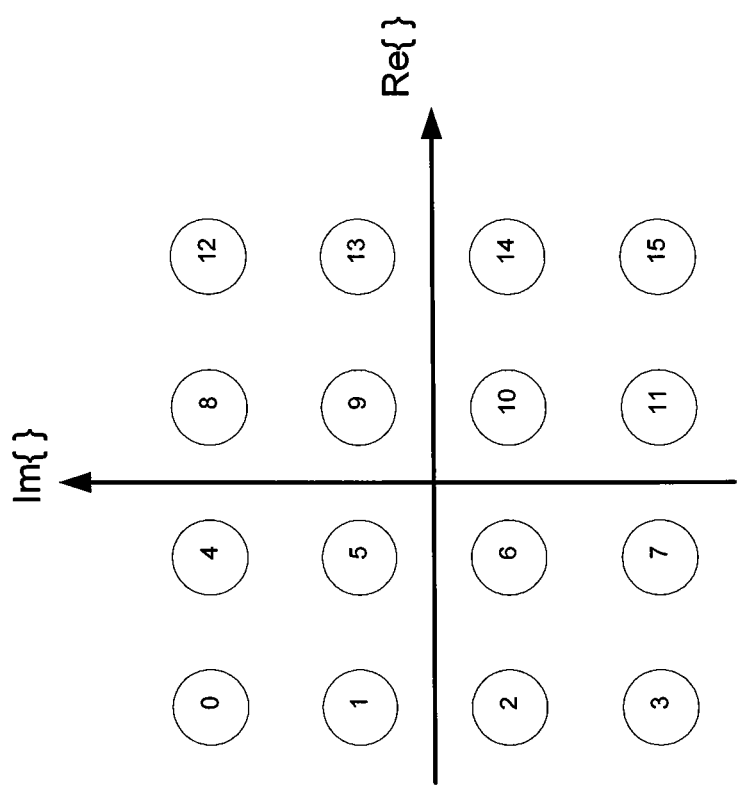
FIG. 4A shows the signal constellation diagram of 16-QAM baseband modulator.

Referring to FIG. 3, the selection of the indexing symbol vector $\bar{s}^n$ in the evaluation of the vector 477 $q^n$ used to encode the transform index n for n=1, 2, . . . , $N_T$ is made from the signal constellation diagram of the complex baseband signal s(k) so as to minimize the probability of error in the detection of n at the OFDM receiver. For example, for the case of 16 QAM modulation with the signal constellation diagram shown in FIG. 4A, $N_T$=4, and $N_i$=1, the indexing symbols may be selected to be the points with indices 0, 3, 12, and 15 resulting in a minimum distance among the indexing symbols equal to 3d where d is the distance among the adjacent symbols in FIG. 4A. With two symbols for indexing, $N_i$=2, and $N_T$=16 the transform index n may be encoded by a code word comprised of a pair of symbols selected from the set of symbols with indices {0, 3, 12, 15} in FIG. 4A, resulting in a minimum Euclidean distance among the code words equal to $3d\sqrt{2} \cong 4.3$ d making the probability of detection error very small.

Figure 4B:
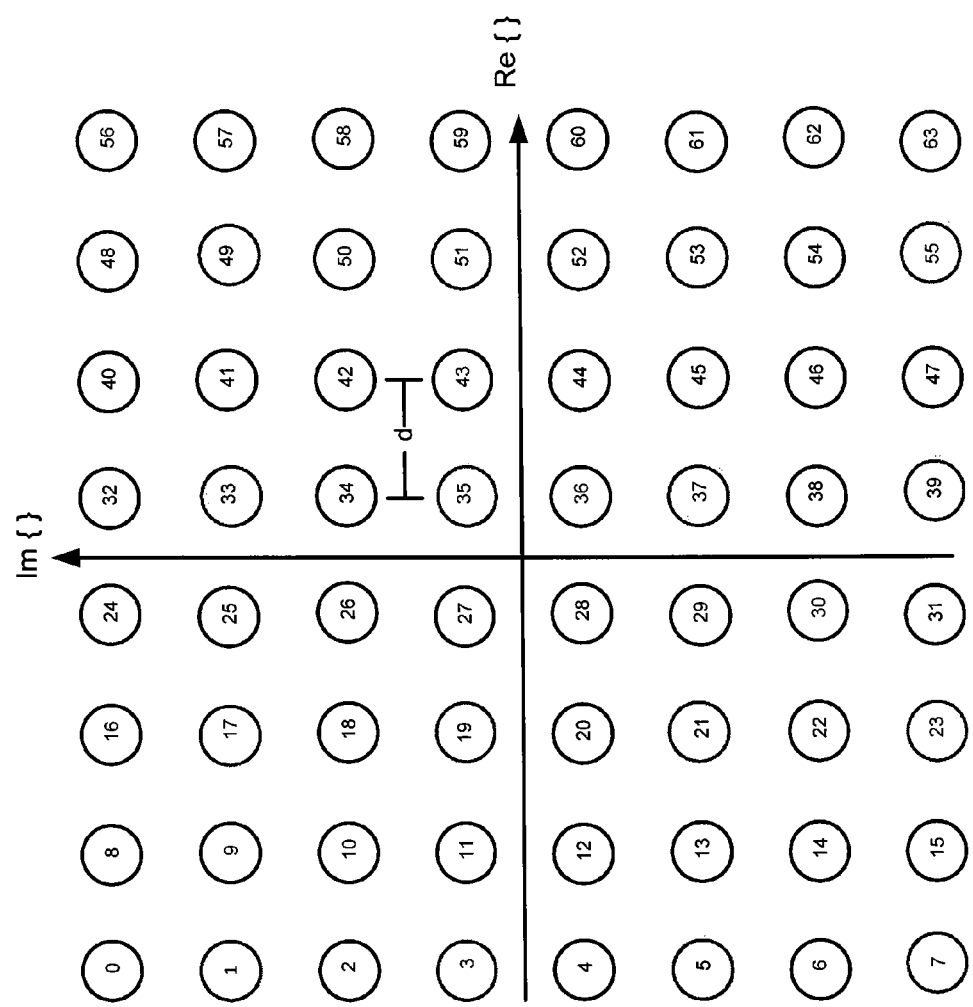
FIG. 4B shows the signal constellation diagram of 64-QAM baseband modulator.

As another example, for the case of 64 QAM modulation with the signal constellation diagram shown in FIG. 4B, $N_T$=16, and $N_i$=1, the indexing symbols may be selected as shown by the shaded circles in FIG. 4B resulting in a minimum distance among the indexing symbols equal to 2d compared to the minimum Euclidean distance equal to d among the symbols in the complete signal constellation diagram, thereby minimizing the probability of detection error in the transform index n in the OFDM receiver. In some cases, more than one indexing symbol may be used for further reduction of the probability of detection error. For example, using two symbols for indexing, the transform index n may be encoded by a code word comprised of a pair of symbols selected from the set of symbols with indices {0, 7, 56, 63} in FIG. 4B, resulting in a minimum Euclidean distance among the code words equal to $7d\sqrt{2} \cong 10d$ making the probability of detection error extremely small.

In the embodiment of the invention given in FIG. 3, the transform indexing symbol vector $\bar{s}^n$ is imbedded in the transformed OFDM signal vector $x^{n_0}(k)$ and introduces some self-noise in the detection of the index $n_0$ at the OFDM receiver. The self-noise may be eliminated in an alternative embodiment of the invention where in the multi transform-DSI implementation the N×N transform matrices $P^n$ are replaced by partitioned matrices shown in (35) for the example case of $N_i$=1 with the indexing symbol $s_i^n$ appearing in the first element of the transformed symbol vector.

$$P^n = \begin{bmatrix} 1 & \bar{0} \\ \bar{0}^T & \bar{P}^{n-1} \end{bmatrix} \quad (35)$$

In (35) $\bar{0}$ denotes a row vector of zeros of length (N−1) and $\bar{P}^{n-1}$ is the (N−1)×(N−1) orthonormal transform matrix. In the example case of Ni=1, the vector $q^n$ in FIG. 3 is replaced by the vector $q^n = P_1^F s_i^n$ where $P_1^F$ denotes the first column of the IFFT transform matrix $P^F$. Equivalently the indexing symbol $s_i^n$ is added to the first component of the transformed symbol vector $X^n(k, i_C)$ that is the FFT of the transformed OFDM signal vector 475n $x^n(k, i_C)$ if FIG. 3.

In the alternative embodiment of the invention, the indexing symbol vector is not a part of the orthonormal transform operation and may be detected more directly at the OFDM receiver from the first component of the modulation symbol vector X(k) obtained after performing the FFT operation on the received OFDM signal vector $x^{n_0}(k)$. The same partitioning approach may be applied for the transmission of the pilot symbols. For example, if in the example of $N_i$=1 as in (35) and with one pilot symbol used in the OFDM system for the synchronization purposes, not shown in FIGS. 1-3, appearing in the last element of the modulated symbol vector $X^n(k, i_C)$, the matrix $P^n$ may be partitioned as in (36).

$$P^n = \begin{bmatrix} 1 & \bar{0} & 0 \\ \bar{0}^T & \bar{P}^{n-2} & 0 \\ 0 & 0 & 1 \end{bmatrix} \quad (36)$$

Figure 5:
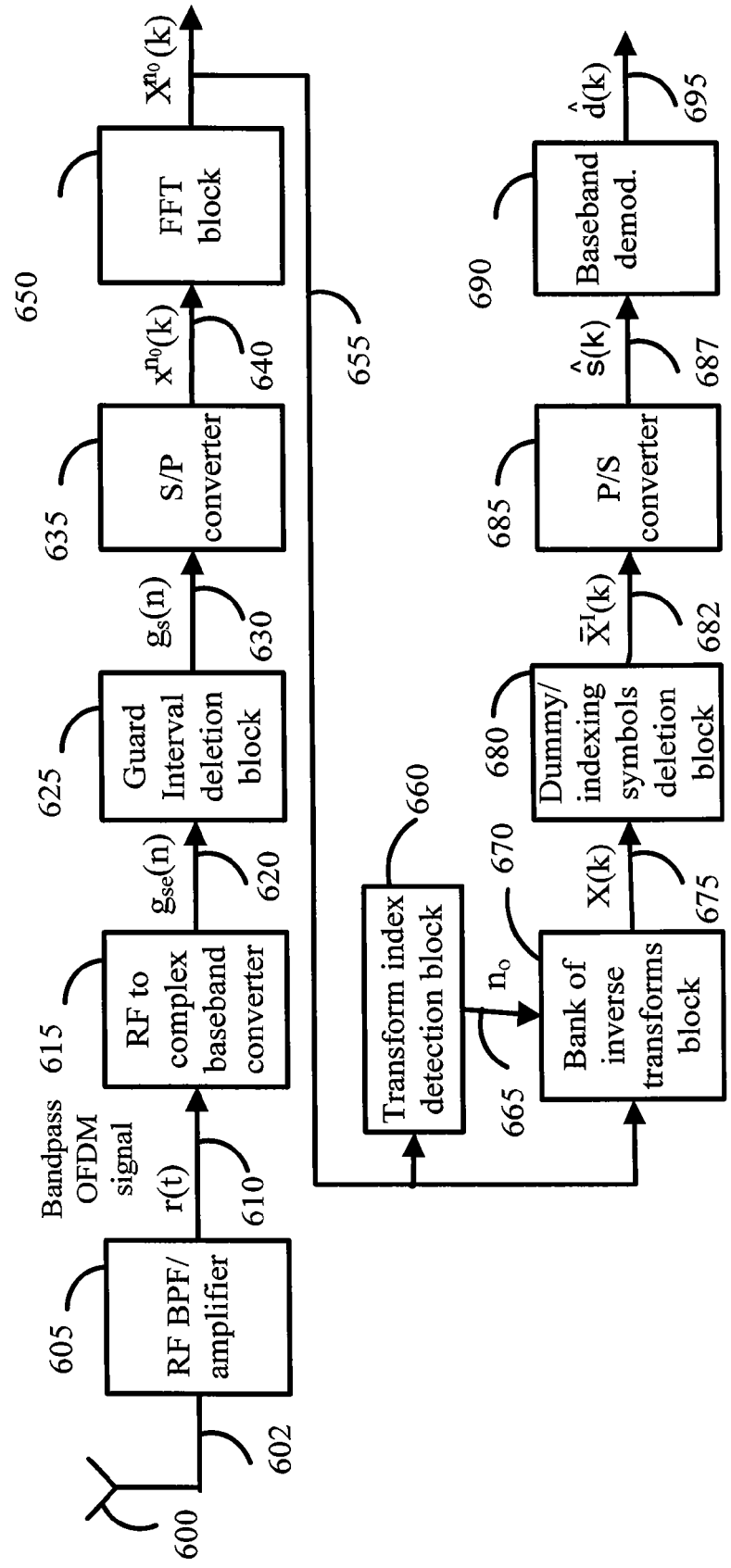
FIG. 5 shows a block diagram of one embodiment of multi transform OFDM receiver system.

In (36) $\bar{0}$ denotes a row vector of zeros of length (N−2) and $\bar{P}^{n-2}$ is the (N−2)×(N−2) transform matrix. The partitioned matrix $P^n$ approach may be applied to the case where the indexing and pilot symbols appear as nonadjacent elements of the transformed symbol vector $X^n(k, i_C)$ FIG. 5 is the block diagram of an embodiment of the multi transform OFDM receiver of the invention. Referring to the block diagram of the multi transform receiver system 4 in FIG. 5, the band pass OFDM signal is received by the receive antenna 600 providing the output 602 to the RF band pass filter (BPF)/amplifier block 605. The RF BPF/amplifier block filters out any out of band signal and noise and amplifies the OFDM signal to an appropriate power level. Referring to FIG. 5, the output r(t) 610 of the RF BPF/amplifier block 605 is provided to the RF to complex baseband converter 615. The signal r(t) 610 at the input of the RF to complex baseband converter 615 is comprised of the band pass OFDM signal and noise that may arise from various sources. In the description of the block diagram of FIG. 5, the noise is ignored for clarity of presentation except in the description of the transform index detection block.

Referring to FIG. 5, the RF to complex baseband converter 615 block down converts the RF signal r(t) to complex baseband, filters the down converted signal by a band limiting filter such as the square root raised cosine filter, and converts the filtered signal to the digital form providing the resulting OFDM signal 620 $g_{se}(n)$ to the guard interval deletion block 625. The guard interval deletion block 625 removes the guard interval from each of the OFDM frame of length by deleting $N_G$ samples from the OFDM frame of length $(N+N_G)$ samples of the OFDM signal 620 $g_{se}(n)$ and provides the serial OFDM signal 630 $g_s(n)$ to the serial to parallel converter 635. Referring to FIG. 5, the serial to parallel converter 635 arranges consecutive N samples of the OFDM frame in to the elements of the transformed OFDM signal vector 640 $x^{n_0}(k)$ corresponding to the optimum transform index $n_0$ selected at the OFDM transmitter.

Referring to FIG. 5, transformed OFDM signal vector 640 $x^{n_0}(k)$ is inputted to the FFT block 650. The FFT block 650 evaluates the fast Fourier transform of the input providing the transformed symbol vector 655 $X^{n_0}(k)$ to the transform index detection block 660. The transform index detection block 660 detects the transform index 665 $n_0$ selected at the OFDM transmitter from the indexing symbol vector $\bar{s}^n$ imbedded in the transformed symbol vector 655 $X^{n_0}(k)$ and provides the transform index 665 $n_0$ to the bank of inverse transforms block 670.

Referring to FIG. 5, the transformed symbol vector 655 $X^{n_0}(k)$ is inputted to the inverse transform block 670. The bank of inverse transforms block 670 is comprised of a bank of $N_T$ transforms that are inverse of the corresponding $N_T$ transforms at the OFDM transmitter of FIGS. 1-3. For the case of orthonormal transform with matrix $P^n$, its inverse transform matrix is given by $P^{nH}$, where H denotes the conjugate transpose operation. For the more specific case of real symmetric orthonormal matrices $P^n$, as is the case wherein the various transforms are obtained by the cascades of the WHT, DCT, and DHT transforms, $P_{nH} = P^n$.

Referring to FIG. 5, the inverse transform block 670 selects the transform with matrix $(P^n)^{-1}$ from bank of $N_T$ inverse transforms with transform index 665 $n_0$ and multiplies the transformed symbol vector 655 $X^{n_0}(k)$ by the matrix $(P^n)^{-1}$ providing the modulation symbol vector 675 $X(k)$ at the output to the dummy/indexing symbols deletion block 680. Referring to FIG. 5, the dummy/indexing symbols deletion block 680 deletes the elements of the modulation symbol vector 675 $X(k)$ containing the dummy/indexing symbols and the symbols corresponding to the pilot signals and provides the information modulation symbol vector 682 $\bar{X}^I(k)$ of length $N_I$ to the parallel to serial converter 685. The parallel to serial converter 685 arranges the components of the vector 682 $\bar{X}^I(k)$ into a serial stream 687 $\hat{s}(k)$ that constitutes the estimate of the information baseband symbol stream 30 $s(k)$ in FIGS. 1-3.

Referring to FIG. 5, the estimate 687 $\hat{s}(k)$ of the information baseband symbol is inputted to the baseband demodulator block 690. The baseband demodulator block 690 detects the baseband symbols on the basis of the signal constellation diagram of the baseband modulator 20 at the OFDM transmitter of FIGS. 1-3 by mapping the estimate 687 $\hat{s}(k)$ into one of the points of the signal constellation diagram of the baseband modulator 20 in the two dimensional signal space. For example, the baseband modulator may be an M=64 QAM modulator with 64 points in the signal constellation diagram shown in FIG. 4B.

The detection of the information baseband symbols may be based on, for example, the maximum likelihood criteria or the minimum distance criteria in the two dimensional signal space. The baseband demodulator block 690 then may maps the detected baseband symbols into groups of m binary digits, wherein m=$\log_2$(M) assumed to be an integer, using the inverse of the map from group of m binary digits into 1 out of M possible information baseband symbols used in the baseband modulator 20 at the OFDM transmitter. The baseband demodulator block 690 may finally concatenate the groups of M binary digits into the serial stream 695 $\hat{d}(k)$ that constitutes the detected version of the user input data 10 $d(k)$ at the OFDM transmitter.

Referring to FIG. 5, the detailed organization of the transform index detection block 660 depends upon the mode of transmission of the transform index 665 $n_0$. In case wherein the indexing symbol vector $\bar{s}^n$ is a sub vector of size $N_i$ of the modulation symbol vector $X(k)$, for example, when the elements of the indexing symbol vector $\bar{s}^n$ are the first $N_i$ elements of the modulation symbol vector $X(k)$, the indexing symbol vector $\bar{s}^n$ may be recovered by pre multiplying the transformed symbol vector $X^{n_0}(k)$ by the matrix $J_{N_i}$ given by $$J_{N_i} = \begin{bmatrix} 1 & 0 & 0 & 0 & 0 & \ldots & 0 \\ 0 & 1 & 0 & 0 & 0 & \ldots & 0 \\ 0 & 0 & \ldots & 0 & 0 & \ldots & 0 \\ 0 & 0 & \ldots & 1 & 0 & \ldots & 0 \end{bmatrix} \quad (37)$$

In the absence of noise the indexing symbol vector $\bar{s}^n$ may be obtained by pre multiplying the transformed symbol vector 655 $X^{n_0}(k)$ by the matrix $J_{N_i}(P^{n_0})^{-1}$. In the presence of noise, the transform index $n_0$ is obtained by minimization of the index $r_n(k)$ over n as $$n_0 = \min_n [r_n(k)] \quad (38)$$

with $$r_n(k) = |J_{N_i}(P^n)^{-1} X^{n_0}(k) - \bar{s}^n|^2 = |P^n_{N_i} X^{n_0}(k) - \bar{s}^n|^2; \quad (39)$$
$$n = 1, 2, \ldots, N_T$$

In (39) $P^n_{N_i}$ denotes the sub matrix of $P^n$ comprised of the first $N_i$ rows of $P^n$ as for the orthonormal real symmetric matrix $P^n$, $(P^n)^{-1} = P^n$. For the case of $N_i = 1$, $P^n_{N_i}$ denotes the first row $P_1^{nH}$ of $P^n$ and $\bar{s}^n = s_i^n$ is complex scalar with $r_n(k)$ given by $$r_n(k) = |P_1^{nH} X^{n_0}(k) + \xi(k) - s_i^n|^2; n=1,2,\ldots,N_T \quad (40)$$

In (40) $\xi(k)$ is the noise term. In the noise free case, the substitution of $X^{n_0}(k) = P^{n_0} X(k)$ in (40) results in $$r_{n_0}(k) = 0 \quad (41a)$$

$$r_n(k) = |\psi^n X(k) - s_i^n|^2; \psi^n = P_1^{nH} P^{n_0}; n \neq n_0; n=1,2,\ldots,N_T \quad (41b)$$

From (41b), the mean squared value of $r_n(k)$; $n \neq n_0$ may be estimated as $$E[r_n(k)] = |\psi_1^n s_i^{n_0} - s_i^n|^2 + |\tilde{\psi}^n|^2 E[|s(k)|^2] \quad (42)$$

In (42) E denotes the expected value operation, and $\tilde{\psi}^n$ is the vector obtained after deleting the first component of $\psi^n$. From (41)-(42), it follows that in the absence of noise the optimization (38) always results in the correct detection of the transform index n. In the presence of noise there may be some nonzero probability of incorrect detection of the transform index n that is a function of the number of indexing symbols $N_i$ and the signal to noise power ratio $\gamma$.

$$\gamma = E[|s(k)|^2]/E[|\xi(k)|^2] \quad (43)$$

Figure 6A:
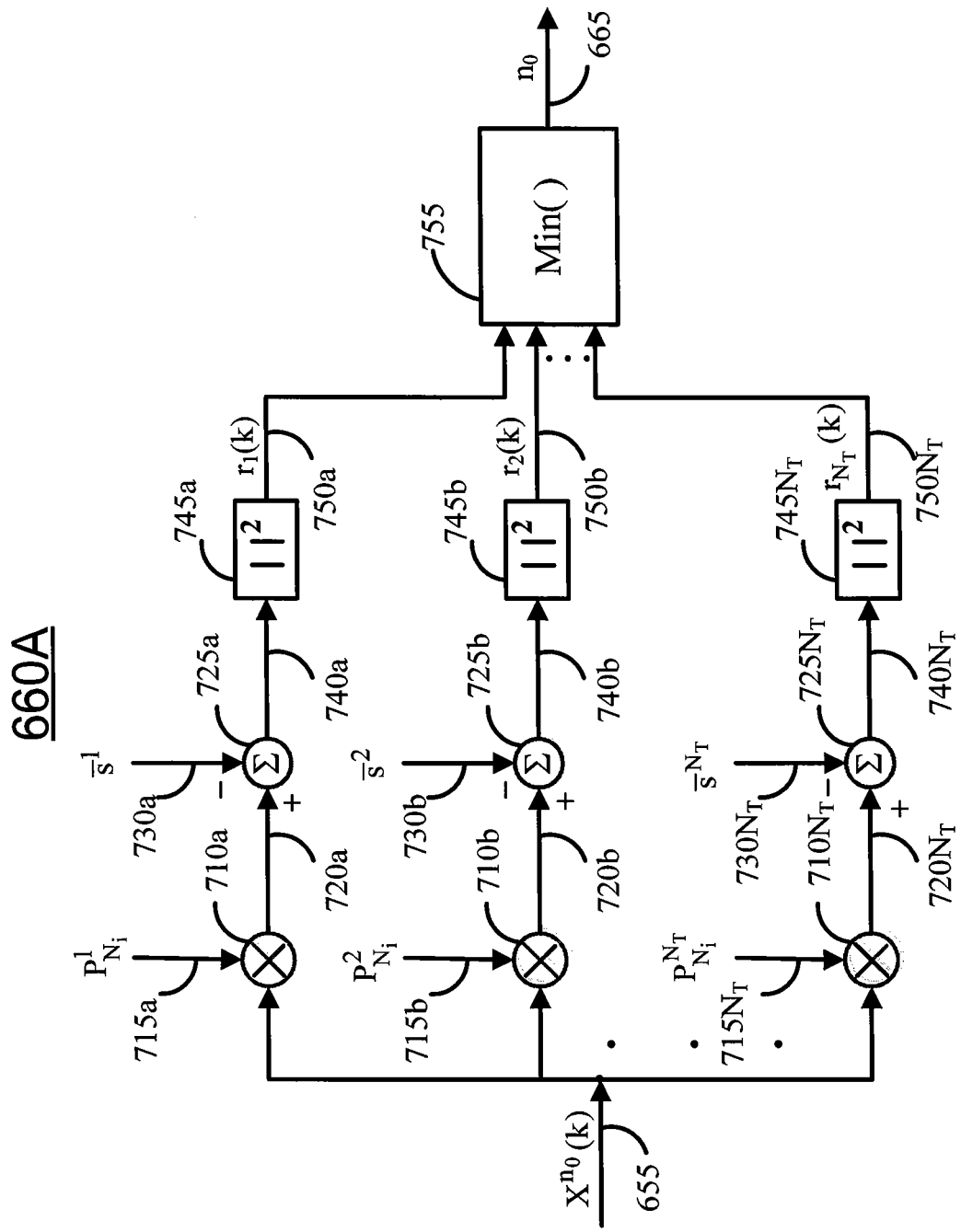
FIG. 6A shows a block diagram of one embodiment of the transform index detection unit.

FIG. 6A shows the block diagram of one of the embodiments 660A of the transform index detection block 660 for the case where the indexing symbol vector $\bar{s}^n$ is a sub vector of the modulation symbol vector $X(k)$ in the OFDM transmitter as is the case with the OFDM transmitter of FIG. 3. Referring to FIG. 6A, the transformed symbol vector 665 $X^{n_0}(k)$ is inputted to the multipliers 710a, b, . . . , $N_T$. The multiplier 710n is inputted with the matrix $P_{N_i}^n$ for n=1, 2, . . . , $N_T$ wherein $P_{N_i}^n$ is a sub matrix of the matrix $(P^n)^{-1}$ comprised of the $N_i$ rows of $(P^n)^{-1}$ $N_i$ with row indices equal to the indices of the elements of the modulation symbol vector $X(k)$ assigned to the elements of the indexing symbol vector $\bar{s}^n$. For the case where the transform matrix $P^n$ is real symmetric orthonormal matrix $(P^n)^{-1} = P^n$.

Referring to FIG. 6A, the multiplier 710n pre multiplies the transformed symbol vector $X^{n_0}(k)$ by the matrix $P_{N_i}^n$ and provides the product 720n $P_{N_i}^n X^{n_0}(k)$ to the adder 730n for n=1, 2, . . . , $N_T$. The adders 725n, n=1, 2, . . . , $N_T$ are inputted with the respective indexing symbol vectors 730 $\bar{s}^n$ containing the encoded transform index n at the OFDM transmitter.

Referring to FIG. 6A, the adder 725n subtracts the indexing symbol vector 730n $\bar{s}^n$ from the product 720n $P_{N_i}^n X^{no}(k)$ providing the difference 740n to the mod square block 745n for n=1, 2, ..., $N_T$. Referring to FIG. 6A, the mod square block 745n evaluates the square of the absolute value of the input 740n, providing the result 750n $r_n(k)$ n=1, 2, ..., $N_T$, to the minimum operation block 755. The minimum operation block 755 finds the minimum among the $N_T$ inputs 750 a, b, ..., $N_T$ and provides the index 665 $n_0$ of the minimum input at the output of the transform index detection block 660A.

Figure 6B:
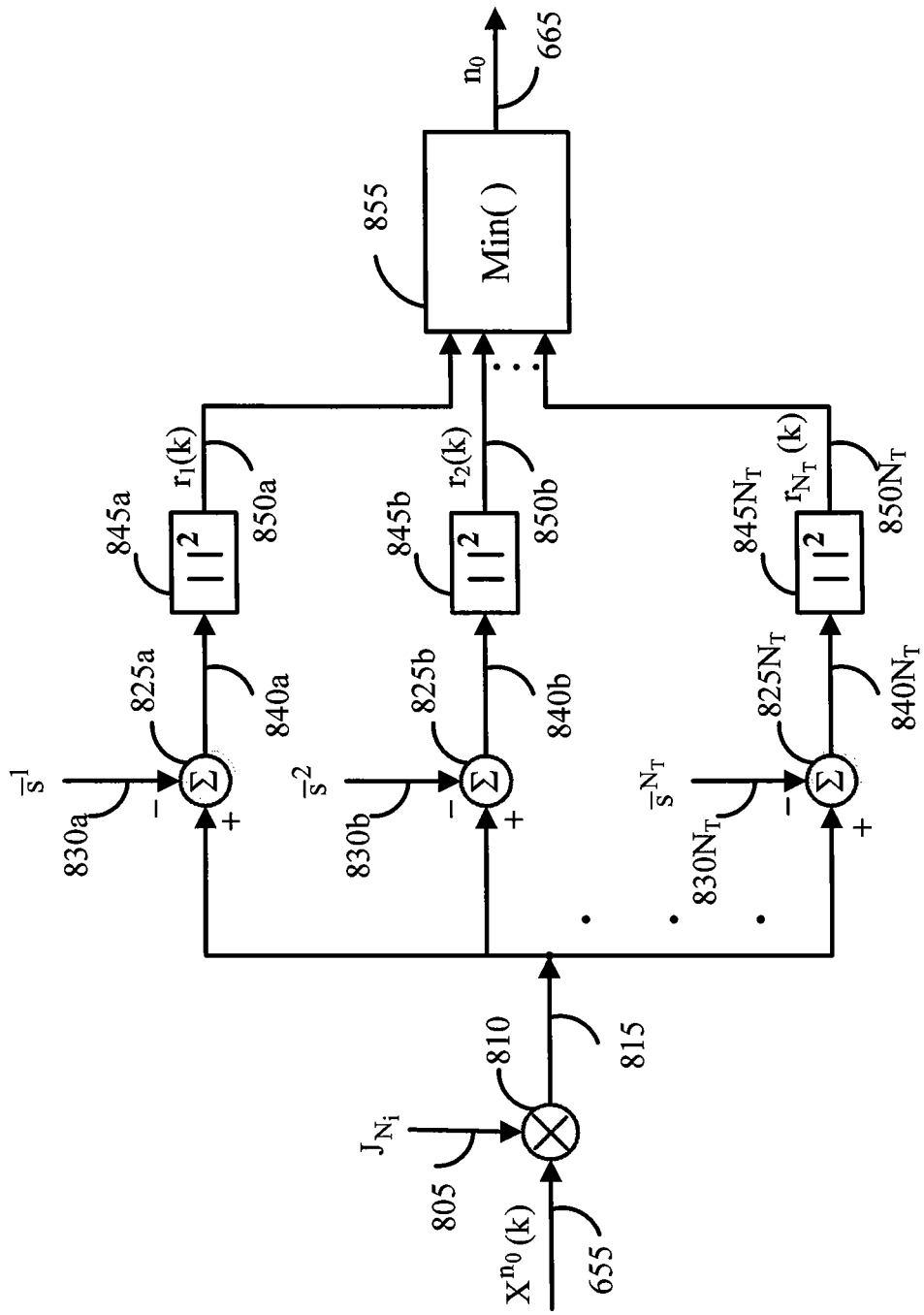
FIG. 6B shows a block diagram of one embodiment of the transform index detection unit.

FIG. 6B shows the block diagram of one of the embodiments 660B of the transform index detection block 660 for the case where the indexing symbol vector $\bar{s}^n$ is a sub vector of the transformed symbol vector in the OFDM transmitter $X^{no}(k)$, with the indices of the elements of the vector 665 $X^{no}(k)$ assigned to the elements of the indexing symbol vector $\bar{s}^n$ given by $i_1, i_2, \ldots, i_{H_i}$, as is the case with the OFDM transmitter of the invention using partitioned transformed matrices illustrated by (35)-(36).

Referring to FIG. 6B, the transformed symbol vector 665 $X^{no}(k)$ is inputted to the multipliers 810. The multiplier 810 is inputted with the ($N_i \times N$) matrix $J_{N_i}$ given by (37) with the $j^{th}$ row of $J_{N_i}$ having all its elements equal to 0 except for a 1 in the position with the column index j=1, 2, ..., $N_i$. The output 815 of the multiplier 810 is a sub vector of the transformed symbol vector 665 $X^{no}(k)$, of size Ni and is equal to the indexing symbol vector $\bar{s}^{no}$, plus noise not shown in FIG. 6B.

Referring to FIG. 6B, the multiplier 810 provides the sub vector 815 of the transformed symbol vector 665 $X^{no}(k)$ to the adders 825n; n=1, 2, ..., $N_T$. The adders 825n, n=1, 2, ..., $N_T$ are inputted with the respective indexing symbol vectors 830n $\bar{s}^n$ containing the encoded transform index n at the OFDM transmitter.

Referring to FIG. 6B, the adder 825n subtracts the indexing symbol vector 830n $\bar{s}^n$ from the product 815 providing the difference 840n to the mod square block 845n for n=1, 2, ..., $N_T$. Referring to FIG. 6B, the mod square block 845n evaluates the square of the absolute value of the input 840n, providing the result 850n $r_n(k)$ n=1, 2, ..., $N_T$, to the minimum operation block 855. The minimum operation block 855 finds the minimum among the $N_T$ inputs 850 a, b, ..., $N_T$ and provides the index 665 $n_0$ of the minimum input at the output of the transform index detection block 660B.

Simulation results on the PAPR performance of the multi transform OFDM system and the multi transform-DSI system of the invention also referred to as the OFDM-OP-DSI System are presented. The complementary cumulative probability distribution function (CCDF) of the PAPR is obtained by simulation runs of $10^4$ OFDM frames. Thus the number of baseband symbols simulated in each run is equal to $N \times 10^4$. The simulation are performed with MQAM modulation with the number of points M in the signal constellation selected equal to 16, 64 and 256. Performance results are presented for the case of M=64, the results for the other cases are similar and are not shown. In case of the dummy sequence insertion scheme, the number of dummy symbols $N_D$ is limited to 1 in all of the simulation results as an increase in the length of the dummy sequence provides only marginal improvement at the cost of significant increase in computational complexity.

Figure 7:
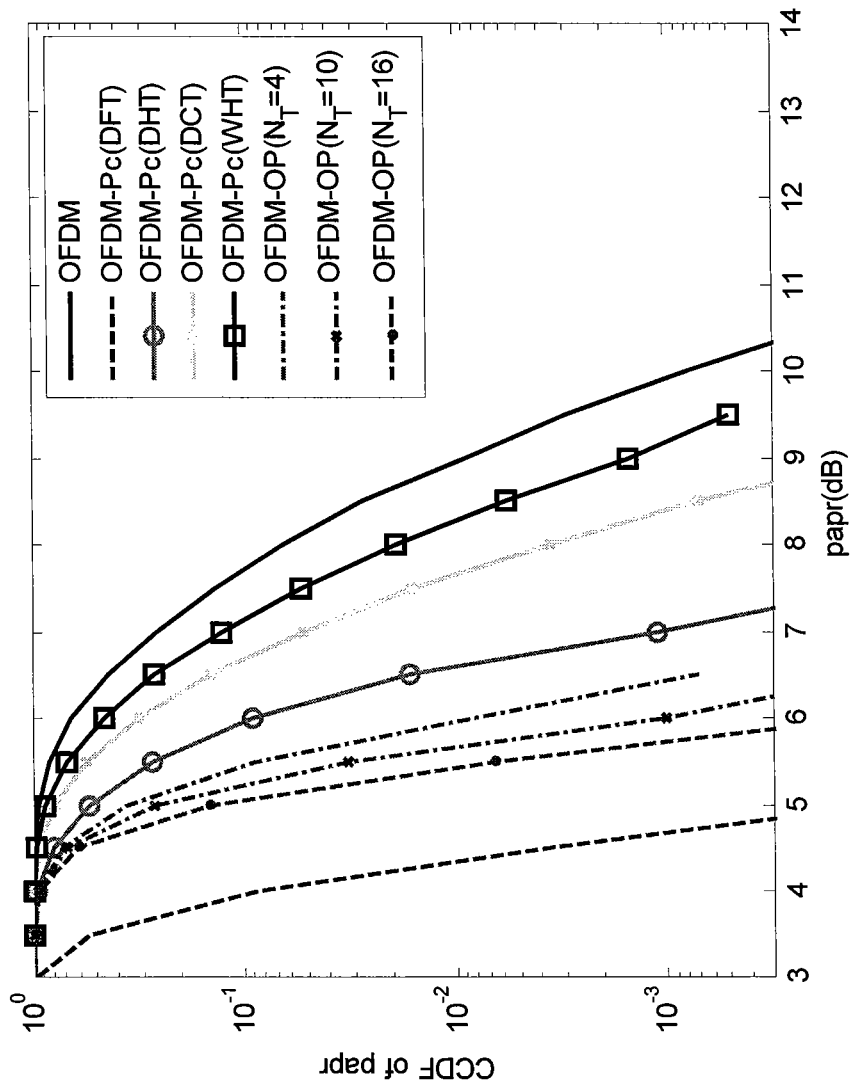
FIG. 7 shows complementary cumulative distribution function (CCDF) of the PAPR achieved with the multi transform OFDM system.

FIG. 7 plots the CCDF of the PAPR obtained with the multi transform OFDM with $N_T$ taking values 1, 4, 10, and 16. The 16 transforms used in the simulations are listed in Table1 with the transforms with the least indices selected for the case of $N_T < 16$. The case of $N_T = 1$ corresponds to the fixed transform of the prior art and is referred to as OFDM-Pc system in the simulation results.

As may be inferred form FIG. 7, for a CCDF value of $10^{-3}$, the multi transform OFDM system of the invention provides an improvement of about 1 dB over the discrete Hartley transform that has the best performance among all of the fixed transform methods of the prior art. It may be also inferred from FIG. 7 that the PAPR performance improves with increasing $N_T$ and thus it may be possible to reduce the PAPR obtained with the multi transform OFDM system further by increasing $N_T$ beyond 16. The graph labeled OFDM-Pc(DFT) in FIG. 7 refers to the case where the selected orthogonal transform is the FFT or DFT (discrete Fourier transform), with $N_T = 1$. With the inverse of the FFT transform following the orthogonal transform the overall OFDM system in this case reduces to the case of the single carrier system with N=1.

Figure 8:
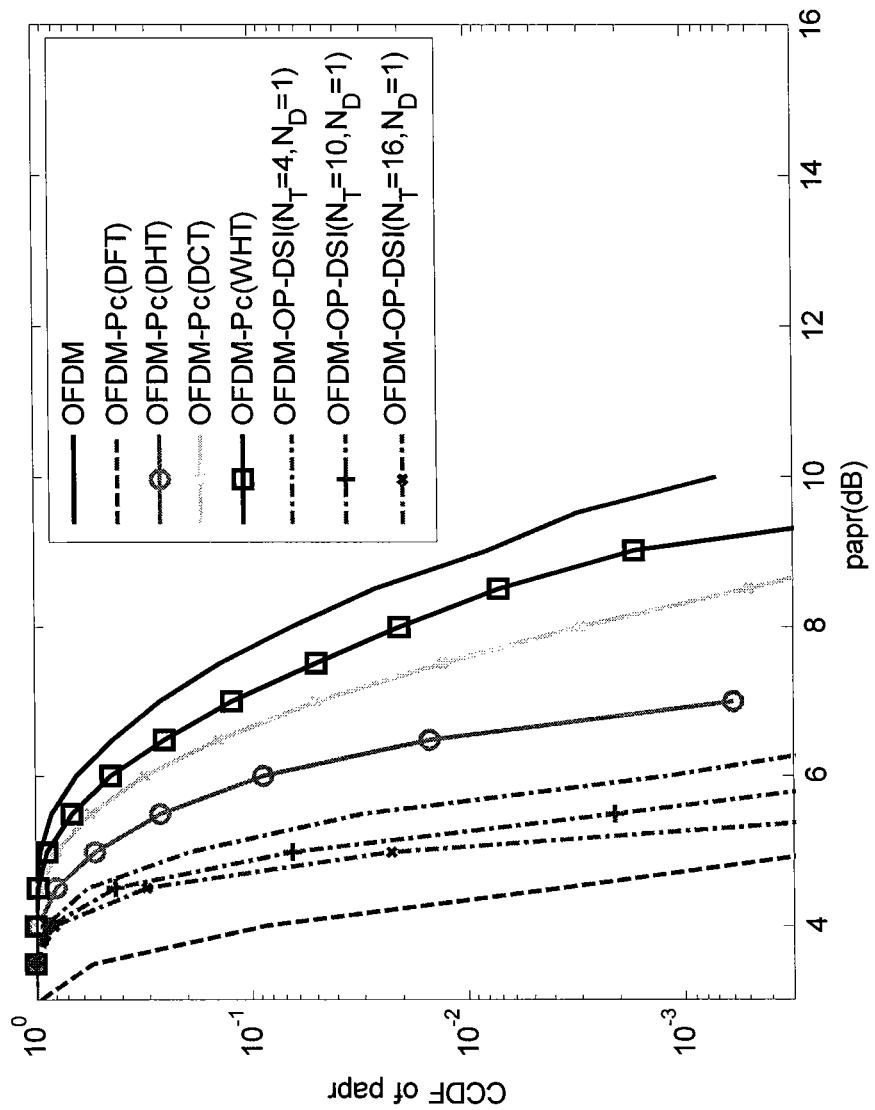
FIG. 8 shows complementary cumulative distribution function (CCDF) of the PAPR achieved with the multi transform-DSI OFDM system.

FIG. 8 shows the simulation result for the multi transform-DSI OFDM, labeled as OFDM-OP-DSI in FIG. 8, with the use of one dummy symbol $N_D = 1$, indicated by d=1 in the figure, with the number of trials for the dummy sequence $N_C$ selected equal to M, along with the result obtained for the case of $N_T = 1$ corresponding to the fixed transform method for comparison. As may be inferred from FIG. 8, the OFDM-OP-DSI system with $N_T = 12$ provides an improvement of about 1.5 dB in PAPR over the fixed transform system, and the PAPR performance of the OFDM-OP-DSI system is only about 0.8 dB worse compared to the case of a single carrier. The performance is about 0.3 dB better with $N_T = 16$, not shown in FIG. 8. Simulation results, not shown, performed for the DHT transform that is known best fixed transform, the marginal improvement due to DSI when used with the DHT is limited to about 0.1 dB.

Figure 9:
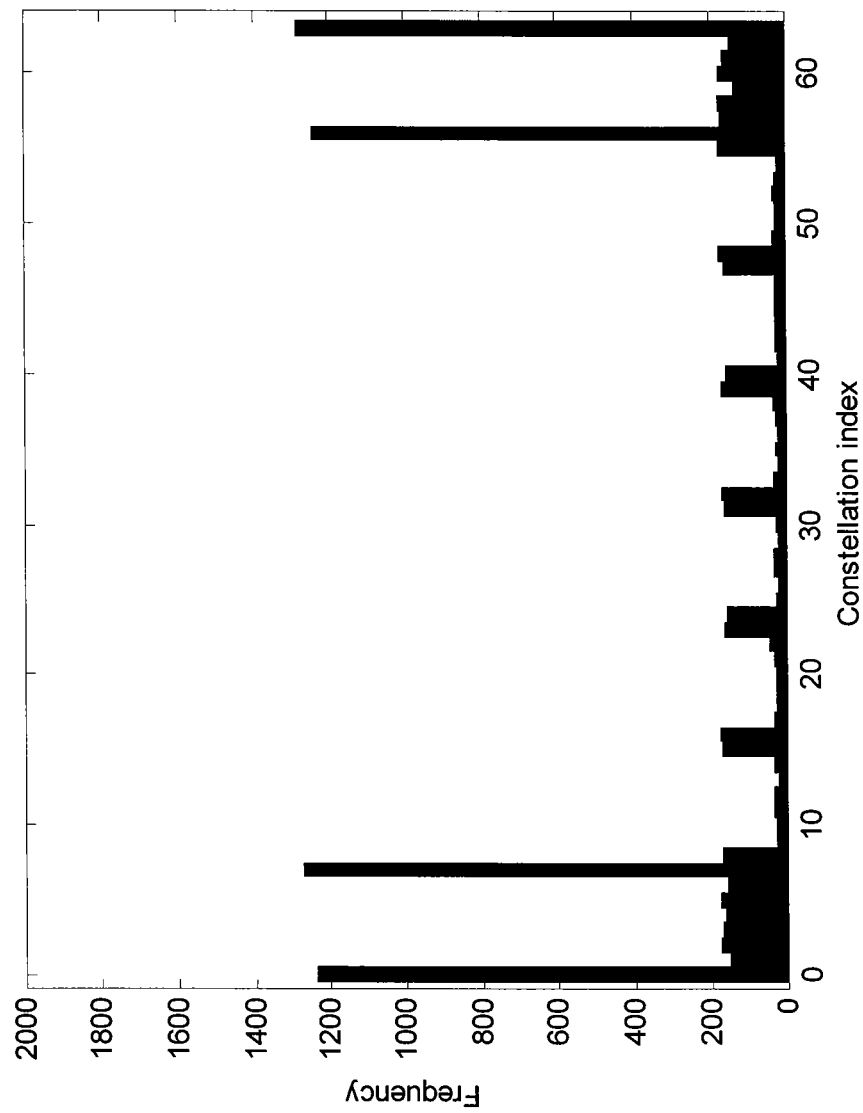
FIG. 9 shows histogram of the constellation index of the dummy symbol used in the multi transform-DSI OFDM system with the order of modulation M=64 and the number of transforms $N_T$=16.

FIG. 9 plots the histogram of the selected dummy symbol for the case of 64 QAM modulation and $N_T = 16$ for the OFDM-OP-DSI system. Examination of FIG. 9 shows that the histogram has sharp peaks at four of the 64 possible values in the constellation diagram shown in FIG. 4B. Similar result, not shown, is obtained for 16 QAM modulation. It may possible to reduce the number of trials for the dummy symbol $N_C = N_W$ to 4, so as to reduce the computational requirements of the system, without any significant degradation in performance.

Table 2 summarizes the PAPR at a CCDF value of $10^{-3}$ for the OFDM-Pc-DSI system. In a different embodiment of the OFDM-Pc-MDSI system referred to as the OFDM-Pc-MDSI system, for the purpose of minimizing the computational effort, the optimum dummy symbol for the case of $P^n = I$ (identity transform) may be obtained first and the same dummy symbol used with all of the transforms. Table 2 includes the case of single carrier transmission for comparison and also lists the APAPR defined as the difference between the PAPR achieved with the OFDM-Pc-DSI method and that of the single carrier transmission at the CCDF value of $10^{-3}$.

As may be inferred from Table 2 the OFDM-Pc-DSI system with $N_T = 12$ provides an improvement of 4.46 dB in PAPR over the OFDM with the resulting PAPR only 0.78 dB higher than for the single carrier transmission. With $N_T = 16$ the improvement is 4.75 dB in PAPR over the OFDM with the resulting PAPR only 0.49 dB higher than for the single carrier transmission thus almost entirely eliminates the PAPR limitation of the OFDM system. It may be possible to reduce this gap of 0.49 dB further by increasing the number of dummy symbols to more than 1 and/or by increasing the number of total transforms beyond 16 considered in the simulations. On the other hand, the computational complexity can be significantly reduced by restricting the number of symbols $N_W$ from which the dummy symbol is selected at the cost of some increase in the PAPR. As shown in the table, with $N_W=4$, and $N_T=12$, the reduction in PAPR is 4.18 dB compared to 4.46 dB with $N_W=64$. For the case of $N_T=16$, and $N_W=4$, the PAPR reduction is 4.70 dB compared to 4.75 dB with $N_W=64$, thus resulting in a negligible degradation in PAPR due to the reduction in $N_W$ from 64 to 4. However, the reduction in $N_W$ from 64 to 4 results in a very significant reduction in the computational requirements.

The multi transform OFDM system of the invention provides a PAPR that is only about 0.5 dB worse than for the single carrier system with only moderate computational requirements, practically eliminating the PAPR penalty incurred due to the use of traditional multi carrier OFDM system. The gap of about 0.5 dB may be further reduced by selecting the number of transforms $N_T$ to be higher than 16.

TABLE 2

PAPR performance of the OFDM-Pc-DSI system (64 QAM, N = 64).

| Parameters of the PAPR reduction method | PAPR (dB) | Reduction in PAPR (dB) | ΔPAPR (dB) |
|---|---|---|---|
| Standard OFDM | 10 | — | 5.24 |
| $N_T = 3, N_w = 64$ | 6.22 | 3.78 | 1.46 |
| $N_T = 12, N_w = 64$ | 5.54 | 4.46 | 0.78 |
| $N_T = 16, N_w = 64$ | 5.25 | 4.75 | 0.49 |
| $N_T = 3, N_w = 4$ | 6.25 | 3.75 | 1.49 |
| $N_T = 12, N_w = 4$ | 5.82 | 4.18 | 1.06 |
| $N_T = 16, N_w = 4$ | 5.30 | 4.70 | 0.55 |
| $N_T = 12, N_w = 64$* | 5.87 | 4.13 | 1.11 |
| Single carrier system | 4.76 | — | 0 |

*the OFDM-OP-MDSI system

Various modifications and other embodiments of the invention applicable to various problems in Communication and other fields will be readily apparent to those skilled in the art in the field of invention. The multi transforms architectures of the invention can be readily modified and applied to various fields where such an architecture is applicable. Examples of such fields include Radars, sonar, digital audio systems and so on.

It is to be understood that the figures and descriptions of the present invention have been simplified to illustrate elements that are relevant for a clear understanding of the present invention, while eliminating other elements, for purposes of clarity. Those of ordinary skill in the art will recognize that these and other elements may be desirable. However, because such elements are well known in the art and because they do not facilitate a better understanding of the present invention, a discussion of such elements is not provided herein.

In general, it will be apparent to one of ordinary skill in the art that at least some of the embodiments described herein, including, for example, most of the modules of FIGS. 1-3 and 5-6 may be implemented in many different embodiments of software, firmware, and/or hardware, for example, based on Field Programmable Gate Array (FPGA) chips or implemented in Application Specific Integrated Circuits (ASICS). The software and firmware code may be executed by a computer or computing device comprising a processor (e.g., a DSP or any other similar processing circuit) including, for example, the computing device 1000 described below. The processor may be in communication with memory or another computer readable medium comprising the software code. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. According to various embodiments, the software may be firmware stored at an EEPROM and/or other non-volatile memory associated a DSP or other similar processing circuit. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Figure 10:
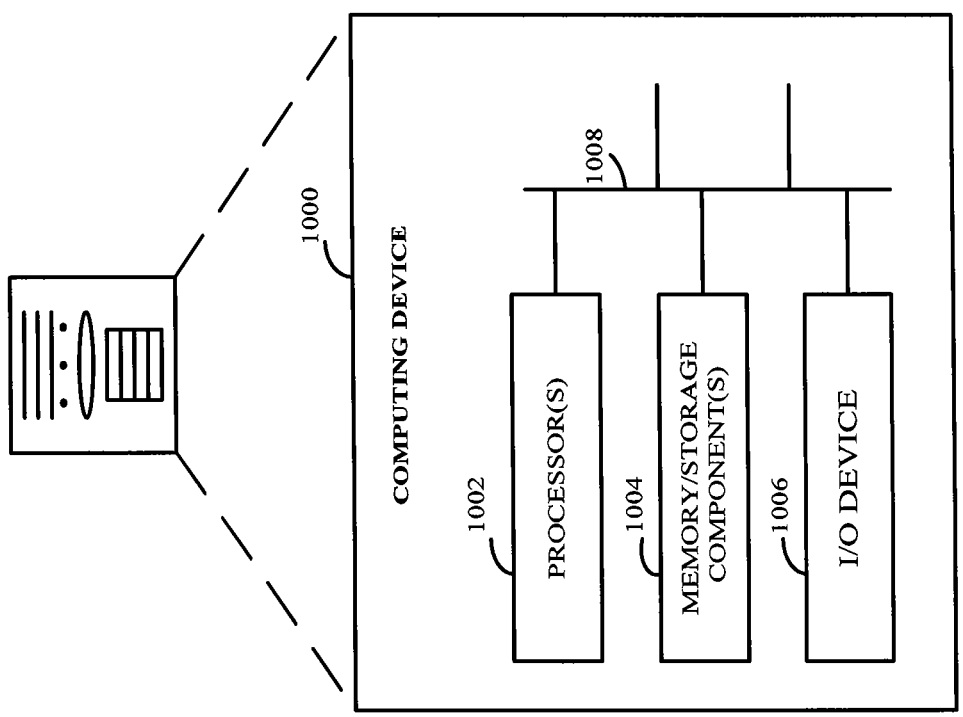
FIG. 10 shows one embodiment of an example computer device.

FIG. 10 shows an example of a computing device 1000 according to one embodiment. For the sake of clarity, the computing device 1000 is illustrated and described here in the context of a single computing device. However, it is to be appreciated and understood that any number of suitably configured computing devices can be used to implement a described embodiment. For example, in at least some implementations, multiple communicatively linked computing devices may be used. One or more of these devices can be communicatively linked in any suitable way such as via one or more networks. One or more networks can include, without limitation: the Internet, one or more local area networks (LANs), one or more wide area networks (WANs) or any combination thereof.

In the example of FIG. 16, the computing device 1000 comprises one or more processor circuits or processing units 1002, one or more memory circuits and/or storage circuit component(s) 1004 and one or more input/output (I/O) circuit devices 1006. Additionally, the computing device 1000 comprises a bus 1008 that allows the various circuit components and devices to communicate with one another. The bus 1008 represents one or more of any of several types of bus structures, including a memory bus or memory controller, a peripheral bus, an accelerated graphics port, and a processor or local bus using any of a variety of bus architectures. The bus 1008 may comprise wired and/or wireless buses.

The processing unit 1002 may be responsible for executing various software programs such as system programs, applications programs, and/or program modules/blocks to provide computing and processing operations for the computing device 1000. The processing unit 1002 may be responsible for performing various voice and data communications operations for the computing device 1000 such as transmitting and receiving voice and data information over one or more wired or wireless communications channels. Although the processing unit 1002 of the computing device 1000 is shown in the context of a single processor architecture, it may be appreciated that the computing device 1000 may use any suitable processor architecture and/or any suitable number of processors in accordance with the described embodiments. In one embodiment, the processing unit 1002 may be implemented using a single integrated processor.

The processing unit 1002 may be implemented as a host central processing unit (CPU) using any suitable processor circuit or logic device (circuit), such as a as a general purpose processor. The processing unit 1002 also may be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the processing unit 1002 may be coupled to the memory and/or storage component(s) 1004 through the bus 1008. The bus 1008 may comprise any suitable interface and/or bus architecture for allowing the processing unit 1002 to access the memory and/or storage component(s) 1004. Although the memory and/or storage component(s) 1004 may be shown as being separate from the processing unit 1002 for purposes of illustration, it is worthy to note that in various embodiments some portion or the entire memory and/or storage component(s) 1004 may be included on the same integrated circuit as the processing unit 1002. Alternatively, some portion or the entire memory and/or storage component(s) 1004 may be disposed on an integrated circuit or other medium (e.g., hard disk drive) external to the integrated circuit of the processing unit 1002. In various embodiments, the computing device 1000 may comprise an expansion slot to support a multimedia and/or memory card, for example.

The memory and/or storage component(s) 1004 represent one or more computer-readable media. The memory and/or storage component(s) 1004 may be implemented using any computer-readable media capable of storing data such as volatile or non-volatile memory, removable or non-removable memory, erasable or non-erasable memory, writeable or re-writeable memory, and so forth. The memory and/or storage component(s) 1004 may comprise volatile media (e.g., random access memory (RAM)) and/or nonvolatile media (e.g., read only memory (ROM), Flash memory, optical disks, magnetic disks and the like). The memory and/or storage component(s) 1004 may comprise fixed media (e.g., RAM, ROM, a fixed hard drive, etc.) as well as removable media (e.g., a Flash memory drive, a removable hard drive, an optical disk). Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The one or more I/O devices 1006 allow a user to enter commands and information to the computing device 1000, and also allow information to be presented to the user and/or other components or devices. Examples of input devices include data ports, analog to digital converters (ADCs), digital to analog converters (DACs), a keyboard, a cursor control device (e.g., a mouse), a microphone, a scanner and the like. Examples of output devices include data ports, ADC's, DAC's, a display device (e.g., a monitor or projector, speakers, a printer, a network card). The computing device 1000 may comprise an alphanumeric keypad coupled to the processing unit 1002. The keypad may comprise, for example, a QWERTY key layout and an integrated number dial pad. The computing device 1000 may comprise a display coupled to the processing unit 1002. The display may comprise any suitable visual interface for displaying content to a user of the computing device 1000. In one embodiment, for example, the display may be implemented by a liquid crystal display (LCD) such as a touch-sensitive color (e.g., 76-bit color) thin-film transistor (TFT) LCD screen. The touch-sensitive LCD may be used with a stylus and/or a handwriting recognizer program.

The processing unit 1002 may be arranged to provide processing or computing resources to the computing device 1000. For example, the processing unit 1002 may be responsible for executing various software programs including system programs such as operating system (OS) and application programs. System programs generally may assist in the running of the computing device 1000 and may be directly responsible for controlling, integrating, and managing the individual hardware components of the computer system. The OS may be implemented, for example, as a Microsoft® Windows OS, Symbian OS™, Embedix OS, Linux OS, Binary Run-time Environment for Wireless (BREW) OS, JavaOS, or other suitable OS in accordance with the described embodiments. The computing device 1000 may comprise other system programs such as device drivers, programming tools, utility programs, software libraries, application programming interfaces (APIs), and so forth.

In various embodiments disclosed herein, a single component may be replaced by multiple components and multiple components may be replaced by a single component to perform a given function or functions. Except where such substitution would not be operative, such substitution is within the intended scope of the embodiments.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not include, but are not limited to, signals that a computer system or machine hosting or running a computer program can be configured to access, including signals downloaded through the Internet or other networks. For example, the distribution of software may be an Internet download.

I claim:

1. An Orthogonal Frequency Division Multiple Accessing (OFDM) transmitter system comprised of:
    a baseband modulator for receiving and modulating the user input data providing general complex valued, information baseband symbols;
    a serial to parallel converter for providing the modulation symbol vector of dimension N with $N_I \leq N$ elements selected from the information baseband symbols;
    a bank of multiplicity $N_T$ distinct orthonormal transforms units operating on the modulation symbol vector providing the multiplicity $N_T$ transformed symbol vectors;

a bank of multiplicity $N_T$ inverse Fourier transforms units for providing the multiplicity $N_T$ transformed OFDM signal vectors;

a minimum PAPR (peak to average power ratio) evaluation unit for finding an optimum transform index $n_0$ from the multiplicity $N_T$ transformed OFDM signal vectors; and a means of transmitting the optimum transform index.

2. The system of claim 1 further comprised of:

an input selector for providing the transformed OFDM signal vector with index $n_0$ from the multiplicity $N_T$ transformed OFDM signal vectors;

a parallel to serial converter for arranging the elements of the transformed OFDM signal vector with index $n_0$ into a serial OFDM signal;

a guard interval insertion unit for cyclically extending groups of N samples of the serial OFDM signal by $N_G$ samples providing the OFDM signal;

a band limiting filter for shaping the spectrum of the OFDM signal providing the baseband OFDM signal; and a carrier modulation unit for bandpass modulation of the baseband OFDM signal providing the band pass OFDM signal.

3. The system of claim 1 further comprising a dummy symbol generator for providing $N_D \leq N - N_I$ number of dummy symbols selected from a subset of $N_W$ symbols of the signal constellation of the baseband modulator that are imbedded into the modulation symbol vector.

4. The system of claim 3 wherein the subset of $N_W$ symbols correspond to 4 extremal points of a signal constellation diagram of the baseband modulator.

5. The system of claim 3 wherein the subset of $N_W$ symbols is comprised of the 4 symbols, with their respective phase given by 0, $\pi/2$, $\pi$, and $3\pi/2$, from the signal constellation of the baseband modulator selected to be the MPSK modulator.

6. The system of claim 1 wherein the baseband modulator is at least one out of the group comprised of the quadrature amplitude modulator (QAM) and the phase shift keying (PSK) modulator.

7. The system of claim 1 wherein the orthonormal transforms in the bank of multiplicity $N_T$ distinct orthonormal transforms unit are comprised of the cascades of the orthonormal transforms selected from a group of basic transforms.

8. The system of claim 7 wherein the group of basic transforms is comprised of the Walsh Hadamard transform (WHT), discrete cosine transform (DCT), and the discrete Hartley transform (DHT).

9. The system of claim 1 wherein $N_T = 16$.

10. The system of claim 1 wherein the means of transmitting the transform index is comprised of encoding the index n into a number $N_i$ of indexing symbols selected from signal constellation of the baseband modulator, and imbedding the indexing symbols into the modulation symbol vector.

11. The system of claim 1 wherein the means of transmitting the transform index is comprised of transmitting the optimum transform index $n_0$ on a side information channel.

12. The system of claim 1 wherein the orthonormal transform is in the partitioned form.

13. The system of claim 1 wherein the means of transmitting the transform index is comprised of encoding the index n into a number $N_i$ of indexing symbols selected from signal constellation of the baseband modulator; deriving a first vector from the number $N_i$ of indexing symbols; and adding the first vector to the transformed OFDM signal vector.

14. The system of claim 1 further comprised of a dummy symbol generator for providing $N_D \leq N - N_I$ number of dummy symbols selected from a subset of $N_W$ symbols of a signal constellation of the baseband modulator; a means to derive a second vector from the $N_D$ dummy symbols; and an adder for adding the second vector to the transformed OFDM signal vector.

15. A method for OFDM transmission and reception of user input data, the transmission method comprising:

implementing, by a computer device, a baseband modulator for receiving and modulating the user input data providing general complex valued, information baseband symbols;

implementing, by the computer device, a serial to parallel converter for providing the modulation symbol vector of dimension N with $N_I \leq N$ elements selected from the information baseband symbols;

implementing, by the computer device, a bank of multiplicity $N_T$ orthonormal transforms unit operating on the modulation symbol vector providing the multiplicity $N_T$ transformed symbol vectors;

implementing, by the computer device, a bank of multiplicity $N_T$ inverse Fourier transforms unit for providing the multiplicity $N_T$ transformed OFDM signal vectors;

implementing, by the computer device, a minimum PAPR (peak to average power ratio) evaluation unit for finding the optimum transform index $n_0$ from the multiplicity $N_T$ transformed OFDM signal vectors; and implementing, by the computer device, a means of transmitting the transform index;

implementing, by the computer device, a cascade comprised of a parallel to serial converter, a guard interval insertion unit, and a carrier modulation unit for the generation of the OFDM bandpass signal;

amplifying the OFDM bandpass signal; and transmitting by a transmit antenna the user input data.

16. The method of claim 15, wherein the reception method is further comprised of:

receiving the bandpass OFDM signal by a receive antenna;

filtering and amplifying the bandpass OFDM signal by an RF bandpass filter/amplifier;

implementing, by the computer device, an RF to baseband conversion unit for providing the baseband OFDM signal;

implementing, by the computer device, a cascade of a guard interval deletion unit, and a serial to parallel converter for providing the transformed OFDM signal vector from the baseband OFDM signal;

implementing, by the computer device, an FFT unit for providing the transformed symbol vector;

implementing, by the computer device, a transform index detection unit for detecting the transform index $n_0$ from the transformed symbol vector;

implementing, by the computer device, a bank of multiplicity $N_T$ inverse orthonormal transforms for providing the OFDM symbol vector;

implementing, by the computer device, a parallel to serial converter for providing the baseband information symbols from the OFDM symbol vector; and implementing, by the computer device, a baseband demodulation unit for providing the estimate of the user input data.

17. The method of claim 16, wherein the transform index detection unit is comprised of a bank of $N_T$ units of metric computations with the unit n, for n=1 through $N_T$, comprised of an adder for subtracting the vector of $N_i$ indexing symbols form a sub vector of the transformed symbol vector; and a mod square block for generating the $n^{th}$ metric; and a minimum function unit for providing the index $n_0$ corresponding to the minimum of the $N_T$ metrics.

18. The method of claim 15 further comprising generation of $N_D \leq N-N_I$ number of dummy symbols selected from a subset of $N_W$ symbols of the signal constellation of the baseband modulator and imbedding the dummy symbols into the modulation symbol vector.

19. The method of claim 15 wherein the orthonormal transforms in the bank of multiplicity $N_T$ orthonormal transforms unit are comprised of the cascades of the orthonormal transforms selected from a group of basic transforms.

20. The method of claim 15 wherein the means of transmitting the transform index is comprised of encoding the index n into a number $N_i$ of indexing symbols selected from signal constellation of the baseband modulator; deriving a first vector from the number $N_i$ of indexing symbols; and adding the first vector to the transformed OFDM signal vector.

21. The method of claim 15 further comprised of implementing, by the computer device, the dummy symbol generator for providing $N_D \leq N-N_I$ number of dummy symbols selected from a subset of $N_W$ symbols of the signal constellation of the baseband modulator; a means to derive a second vector from the $N_D$ dummy symbols; and an adder for adding the second vector to the transformed OFDM signal vector.

\* \* \* \* \*